(12) United States Patent
Okada et al.

(10) Patent No.: US 7,454,656 B2
(45) Date of Patent: Nov. 18, 2008

(54) STORAGE DEVICE AND STORAGE DEVICE POWER CONSUMPTION CONTROL METHOD

(75) Inventors: Naoki Okada, Odawara (JP); Kenji Mori, Odawara (JP); Nobuyuki Minowa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 10/937,311

(22) Filed: Sep. 10, 2004

(65) Prior Publication Data
US 2006/0020855 A1 Jan. 26, 2006

(30) Foreign Application Priority Data
Jul. 21, 2004 (JP) .............................. 2004-213404

(51) Int. Cl.
*G06F 11/00* (2006.01)
(52) U.S. Cl. .......................................... 714/22; 714/24
(58) Field of Classification Search .................. 714/14, 714/22, 24
See application file for complete search history.

(56) References Cited

U.S. PATENT DOCUMENTS

| 5,588,144 | A | 12/1996 | Inoue et al. |
| 5,828,823 | A | 10/1998 | Byers et al. |
| 5,905,994 | A * | 5/1999 | Hori et al. ................... 711/113 |
| 6,711,692 | B1 * | 3/2004 | Maeda et al. ................ 713/324 |
| 6,993,680 | B2 * | 1/2006 | Fukumori .................... 714/14 |
| 7,058,835 | B1 * | 6/2006 | Sullivan et al. ............. 713/324 |
| 2004/0078508 | A1 | 4/2004 | Rivard |
| 2004/0078663 | A1 * | 4/2004 | Inaba .......................... 714/22 |
| 2005/0120251 | A1 | 6/2005 | Fukumori |

FOREIGN PATENT DOCUMENTS

JP          2003-36127       12/1993

* cited by examiner

*Primary Examiner*—Scott T. Baderman
*Assistant Examiner*—Paul F. Contino
(74) *Attorney, Agent, or Firm*—Reed Smith LLP; Stanley P. Fisher, Esq.; Juan Carlos A. Marquez, Esq.

(57) ABSTRACT

According to the present invention, in cases where a CHA function and a DKA function are mounted within a single package, a battery power supply that is used during the occurrence of power supply trouble is effectively utilized so that the supply of power can be separately controlled for each function. A CHA part and DKA part are disposed in a single control package. When trouble such as a power outage is detected, the CHA part blocks access requests from the host, and initiates end processing. When the end processing of the CHA part is completed, the package internal power supply control part stops the clock supply to the CHA part. Then, when the DKA part completes destage processing, the package internal power supply control part stops the supply of power to the DKA part. The power consumption of the package is lowered in stages in accordance with the progress of the end processing.

17 Claims, 22 Drawing Sheets

STORAGE DEVICE AND STORAGE DEVICE POWER CONSUMPTION CONTROL METHOD

CROSS-REFERENCE TO RELATED APPLICATIONS

This application relates to and claims priority from Japanese Patent Application No. 2004-213404 filed on Jul. 21, 2004, the entire disclosure of which is incorporated herein by reference.

BACKGROUND OF THE INVENTION

1. Field of the Invention

The present invention relates to a storage device and a storage device power consumption control method.

2. Description of the Related Art

For example, storage devices provide a memory region based on a RAID (redundant array of independent inexpensive disks) by disposing disk drives such as hard disk drives, semiconductor memory devices or the like in the form of an array. Host computers (hereafter referred to as "hosts") access the memory region provided by the storage device, and perform the reading and writing of data.

A plurality of control packages are attached to a storage device. A technique is known in which replacements can be made in an active line state without shutting down the power supply of the storage device as a whole in cases where some type of trouble occurs in a given control package (Japanese Patent Application Laid-Open No. 2003-36127). In the technique described in this reference, in cases where trouble is detected within a package, the clock to the circuits inside the package is stopped, and blocking processing is performed.

SUMMARY OF THE INVENTION

In the storage device described in the abovementioned reference, the clock to the internal circuits is stopped and blocking processing is performed in cases where trouble has occurred in a package. However, for example, no consideration is given to reducing the power consumption of the storage device during power outages or the like. Furthermore, since blocking processing is performed in package units, the package as a whole cannot be blocked in cases where only some of the functions of this package are required.

Specifically, in conventional storage devices, a control package that handles data communications with the hosts, and a control package that handles data communications with the disk drive groups, are respectively constructed as separate packages. Accordingly, the control package that controls data communications with the disk drive groups can be blocked following the blocking processing of the package that controls data communications with the hosts. However, in cases where both the function of data communications with the hosts and data communications with the disk drive groups are disposed in the same unit package, the package as a whole cannot be blocked as long as either one of these functions is being utilized. Accordingly, the package needlessly consumes power.

Here, in cases where a power outage or the like occurs, the storage device switches to an auxiliary power supply, and the operation of the device as a whole is continued for a specified time only. During the backup period using the auxiliary power supply, the storage device completes necessary processing, and prepares for recovery from the power outage. Accordingly, if the control package needlessly consumes power, the backup period using the auxiliary power supply is correspondingly shortened, so that the reliability and convenience of use drop.

Accordingly, it is an object of the present invention to provide a storage device and a storage device power supply control method which are devised so that the power consumption of the device as a whole can be reduced in cases where trouble occurs in the supply of power by separately controlling the power consumption of single packages that respectively realize different types of functions in accordance with each function. Furthermore, another object of the present invention is to provide a storage device and storage device power consumption control method which are devised so that the power consumption can be separately controlled for each function within a single package in accordance with the state of progress of specified end processing in cases where the exchange of data with host devices and storage devices is respectively realized within a single package. Still other objects of the present invention will become clear from the following description of embodiments.

In order to solve the abovementioned problems, the storage device of the present invention comprises a communications control part which is connected to host devices and memory devices, and which controls the exchange of data with these host devices and memory devices, a memory part which is used in the communications control part, and a device power supply part which supplies a specified power to the communications control part and memory part. The communications control part comprises a host interface control part that controls the exchange of data with the host devices, a slave interface control part that controls the exchange of data with the memory devices, and an internal power supply control part that controls the supply of power to the host interface control part and slave interface control part. Furthermore, in cases where trouble is detected in the supply of power to the communications control part by the device power supply part, the communications control part separately controls the supply of power to the host interface control part and slave interface control part in accordance with the respective states of execution of first end processing that is performed by the host interface control part and second end processing that is performed by the slave interface control part.

Processing that blocks access requests from the host devices, and processing that causes unprocessed access requests to be reflected in the memory part may be cited as examples of first end processing. Furthermore, processing that causes specified data held in the memory part to be saved in the storage devices may be cited as an example of second end processing.

After confirming the completion of the first end processing, the communications control part can initiate the second end processing. The internal power supply control part can stop the clock supply to the host interface control part when the first end processing is completed, and stop the supply of power to the slave interface control part when the second end processing is completed. Alternatively, the internal power supply control part can also stop the clock supply to the host interface control part when the first end processing is completed, and stop the clock supply to the slave interface control part when the second end processing is completed. Furthermore, the internal power supply control part can also stop the supply of power to the host interface control part when the first end processing is completed, and stop the supply of power to the slave interface control part when the second end processing is completed.

There are cases in which at least some of the means, functions and steps of the present invention are constructed as computer programs that are read in and executed by a microcomputer. For example, such computer programs can be fixed and circulated on recording media such as hard disks, optical disks or the like. Furthermore, computer programs can also be supplied via a communications network such as the internet or the like.

DESCRIPTION OF THE PREFERRED EMBODIMENTS

Embodiments of the present invention will be described below with reference to the attached figures. FIG. 1 is an explanatory diagram which shows in model form the overall concept of the present embodiment. In the present embodiment, as will be described below, a plurality of function realizing parts (1A, 1B) are disposed inside a single control package (1), and power supply boundaries are set between these respective function realizing parts (1A, 1B), so that the supply of power can be separately controlled for each of the function realizing parts (1A, 1B).

Figure 1A:
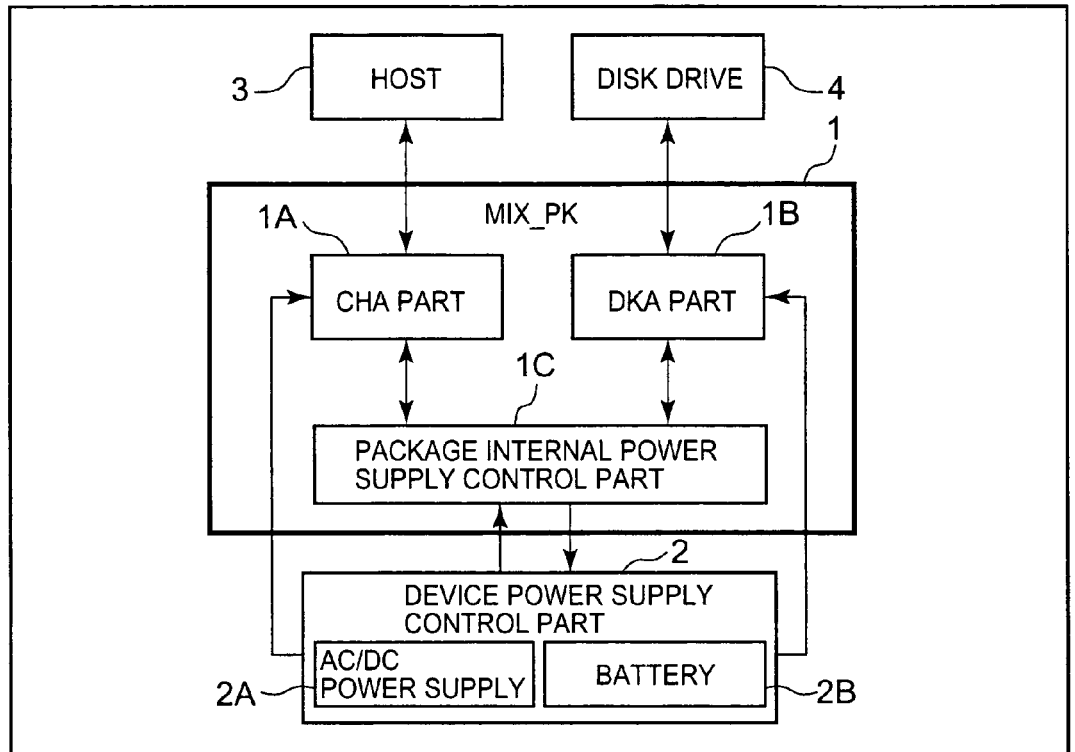
FIG. 1 is an explanatory diagram which shows the concept of an embodiment of the present invention.

As is shown in FIG. 1A, the storage device of the present embodiment comprises a disk drive group 4 that is used to store data, a communications control package 1 that respectively controls the exchange of data between the disk drive group 4 and the host 3, a cache memory (see FIGS. 4 and 7), and a device power supply part 2 that respectively supplies a specified power to the disk drive group 4, communications control package 1 and the like.

The device power supply part comprises a main power supply 2A, and a battery power supply 2B that operates when this main power supply 2A is stopped. The main power supply 2A converts an alternating-current voltage obtained from an external alternating-current power supply into a specified direct-current voltage, and supplies this direct-current voltage. The battery power supply 2B is constructed from (for example) a lead secondary cell, and supplies auxiliary power in cases where the output of the main power supply 2A drops.

The communications control package 1 comprises a channel adapter (hereafter abbreviated to "CHA") pat 1A that controls the exchange of data with the host 3, a disk adapter (hereafter abbreviated to "DKA") part 1B that controls the exchange of data with the disk drive group 4, and a package internal power supply control part 1C that controls the supply of power to the CHA part 1A and DKA part 1B. This communications control package 1 is a composite type package that realizes functions of respectively different types, i.e., a CHA function and a DKA function, within the same package; accordingly, in the figures, the composite type communications control package is indicated as "MIX_PK".

Here, for example, the composite type package 1 can be constructed as a circuit board mounting a microprocessor and integrated circuits, as well as electronic parts such as capacitors, resistors and the like. One or a plurality of expansion boards or auxiliary boards can also be mounted on this circuit board. Even in cases where several auxiliary boards are additionally mounted on the main circuit board, this does not adversely affect the fact that the board as a whole is a single circuit board.

In cases where the device power supply part 2 detects a power outage state of the main power supply 2A, the device power supply part switches the power supply from the main power supply 2A to the battery power supply 2B. In cases where the power supply is switched from the main power supply 2A to the battery power supply 2B, the CHA part 1A initiates first end processing, blocks access requests from the host 3, and writes unprocessed access requests into the cache memory. Specifically, the CHA part 1A copies unprocessed write data for which writing has been requested by the host 3 from the memory inside the CHA part 1A into the cache memory. Then, after the first end processing performed by the CHA part 1A has been completed, the DKA part 1B initiates second end processing, and writes the data stored in the cache memory into the disk drive group 4.

After the CHA part 1A has completed the first end processing, the package internal power supply control part 1C lowers the amount of power consumption of the CHA part 1A as a first stage. Then, as a second stage, the package internal power supply control part 1C lowers the amount of power consumption of the DKA part 1B after the DKA part 1B has completed the second end processing. Thus, the package internal power supply control part 1C separately lowers the amounts of power consumption of the respective parts 1A and 1B in stages in which the processing respectively executed by the respective parts 1A and 1B has been completed. Accordingly, in cases where power supply trouble such as a power outage or the like has occurred, the supply of power to unnecessary parts can be separately stopped or reduced in stages, so that the power consumption of the package as a whole can be reduced. Furthermore, as a result of this, auxiliary power from the battery power supply 2B can be supplied to other parts such as the cache memory or the like, so that the memory backup period can be lengthened.

Figure 1B:
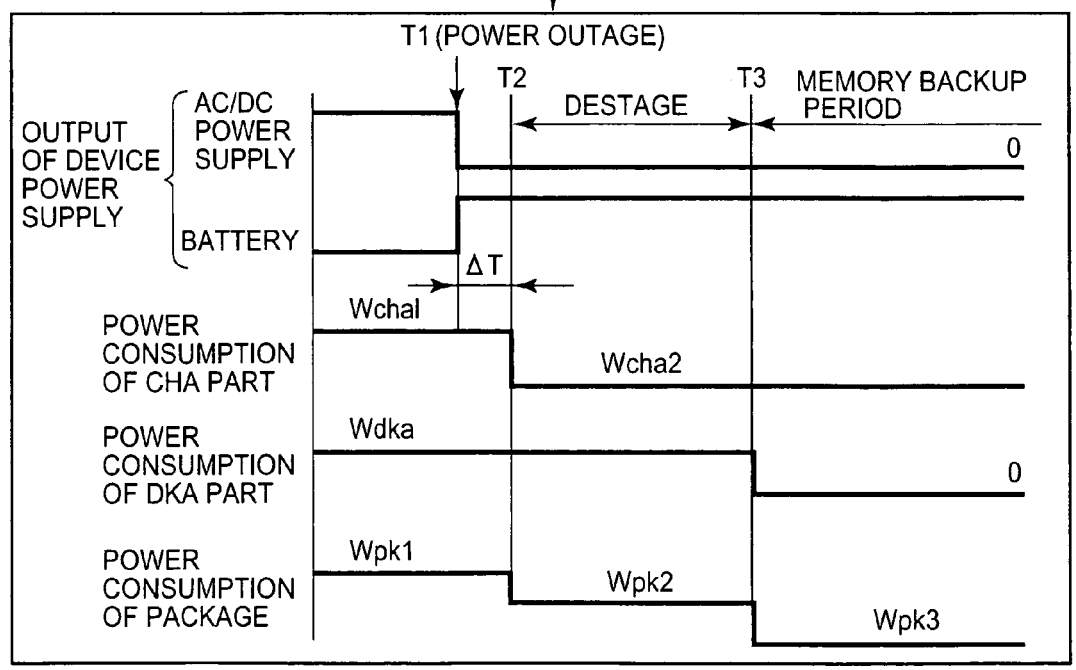

FIG. 1B shows a timing chart of power supply control. Prior to the occurrence of power supply trouble such as a power outage or the like (i.e., in an ordinary state), a specified alternating-current voltage is supplied to the control package 1 from an AC/DC power supply 2A. When a power outage occurs at time T1, the output voltage of the AC/DC power supply 2A drops, and the battery power supply 2B is operated with this voltage drop as a trigger.

The CHA part 1A initiates first end processing beginning at time T1, at which the power supply is switched from the AC/DC power supply 2A to the battery power supply 2B. The CHA part 1A blocks new access requests from the host 3, and processes unprocessed access requests that have already been received. This processing of unprocessed access requests may also be defined as (for example) processing that retains the compatibility of the data and makes it possible to reopen the service in question at the time of recovery from the power outage.

The CHA part 1A completes the first end processing during a specified time $\Delta T$ from the time T1 of the switching of the power supply source. When the processing of the CHA part 1A is completed, the clock supply to the CHA part 1A is stopped, and the power consumption of the CHA part 1A drops from Wcha1 to Wcha2. The power consumption Wcha2 following the stopping of the clock is a value that is substantially close to zero, although this varies according to the number of electronic parts not requiring a clock that are mounted and the like.

When the first end processing performed by the CHA part 1A is completed at time T2, the DKA part 1B initiates destage processing as second end processing. In this destage processing, write data that is stored in the cache memory is saved in the disk drive group 4. In such destage processing, it is necessary to drive a plurality of disk drives that participate in the RAID group (parity group or ECC (error-correcting code) group); accordingly, the power consumption Wdka is relatively large. Here, it is assumed for convenience that the power consumption Wdka shows no substantial variation before and after the initiation of destage processing.

When the destage processing performed by the DKA part 1B is completed at time T3, the supply of power to the DKA part 1B is almost completely stopped. As a result, the power consumption of the DKA part 1B drops substantially to zero. When the destage processing is completed, the storage device initiates memory backup. This memory backup is an operation in which power is supplied to the cache memory, so that the cached data is held for as long as possible. Write data that must be saved among the data stored in the cache memory has already been saved by the destage processing. Accordingly, it is not absolutely necessary to back up the cache memory. However, if the cache memory is backed up, the storage service can be quickly reinitiated when the storage device recovers from the power outage.

Noting the trend of the power consumption of the control package 1 as a whole, it is seen that a power outage occurs at time T1, and that the power consumption of the control package 1 as a whole is constant at Wpk1 during the period (T1-T2) extending from the switching of the power supply from the AC/DC power supply 2A to the battery power supply 2B to the completion of the first end processing performed by the CHA part 1A. When the clock supply to the CHA part 1A is stopped at time T2, the power consumption of the control package 1 drops from Wpk1 to Wpk2 by an amount corresponding to the drop in the power consumption of the CHA part 1A. Furthermore, when the destage processing performed by the DKA part 1B is completed at time T3, the supply of power to the DKA part 1B is stopped, whereupon the power consumption of the control package 1 drops from Wpk2 to Wpk3. Thus, in the present embodiment, since the supply of power can be separately controlled for each function realizing part contained in the control package 1, the power consumption of the control package 1 as a whole can be controlled in stages. As a result, the memory backup period can be lengthened without wastefully consuming the auxiliary power of the battery power supply 2B.

In the present embodiment, stopping of the clock supply and stopping of the power supply are prepared beforehand as means for lowering the amounts of power consumption of the CHA part 1A and DKA part 1B. The package internal power supply control part 1C lowers the amount of power consumption of the CHA part 1A by stopping the clock supply pulse to the CHA part 1A, and lowers the amount of power consumption of the DKA part 1B by stopping the supply of power to the DKA part 1B. As a result, in the CHA part 1A, the circuits that operate in synchronization with the abovementioned clock can be stopped, so that the power consumption drops. In the DKA part 1B, all of the circuits can be stopped (regardless of whether or not these circuits require a clock), so that the power consumption drops.

In the present embodiment, the clock that is supplied to the CHA part 1A is stopped separately in stages according to the conditions of progress of the first end processing that is executed by the CHA part 1A. In cases where the CHA part 1A comprises a communications adapter part that performs communications with the host 3, and an input-output control part that performs communications with the cache memory, the package internal power supply control part 1C stops the clock supply signal to the communications adapter part in accordance with the conditions of progress of the first end processing, and then stops the clock supply to the input-output control circuit.

In the present embodiment, a judgement is made as to whether the power outage state of the main power supply is slight or serious, and the power supply of a single control package 1 is controlled in accordance with the level of this trouble. Specifically, in cases where it is judged that the power outage state is trouble of a slight degree, the package internal power supply control part 1C stops the clock supply to the CHA part 1A and DKA part 1B, so that the amounts of power consumption of the CHA part 1A and DKA part 1B are respectively lowered. On the other hand, in cases where it is judged that the power outage state is trouble of a serious degree, the package internal power supply control part 1C stops the supply of power to the CHA part 1A and DKA part 1B, so that the amounts of power consumption of the CHA part 1A and DKA part 1B are respectively lowered As a result, in the case of a slight degree of trouble, restarting can quickly be accomplished at the time of recovery from the power outage while suppressing the power consumption. Furthermore, in the case of a serious degree of trouble, the power consumption amounts of the CHA part 1A and DKA part 1B are reduced substantially to zero, so that the auxiliary power of the battery power supply 2B can be effectively used.

The details of storage devices constructed according to the present embodiment will be described below. First, the external construction, circuit construction and the like of the storage device will be described; then, the circuit construction and control method of a single control package will be described.

1. FIRST EXAMPLE

Figure 2:
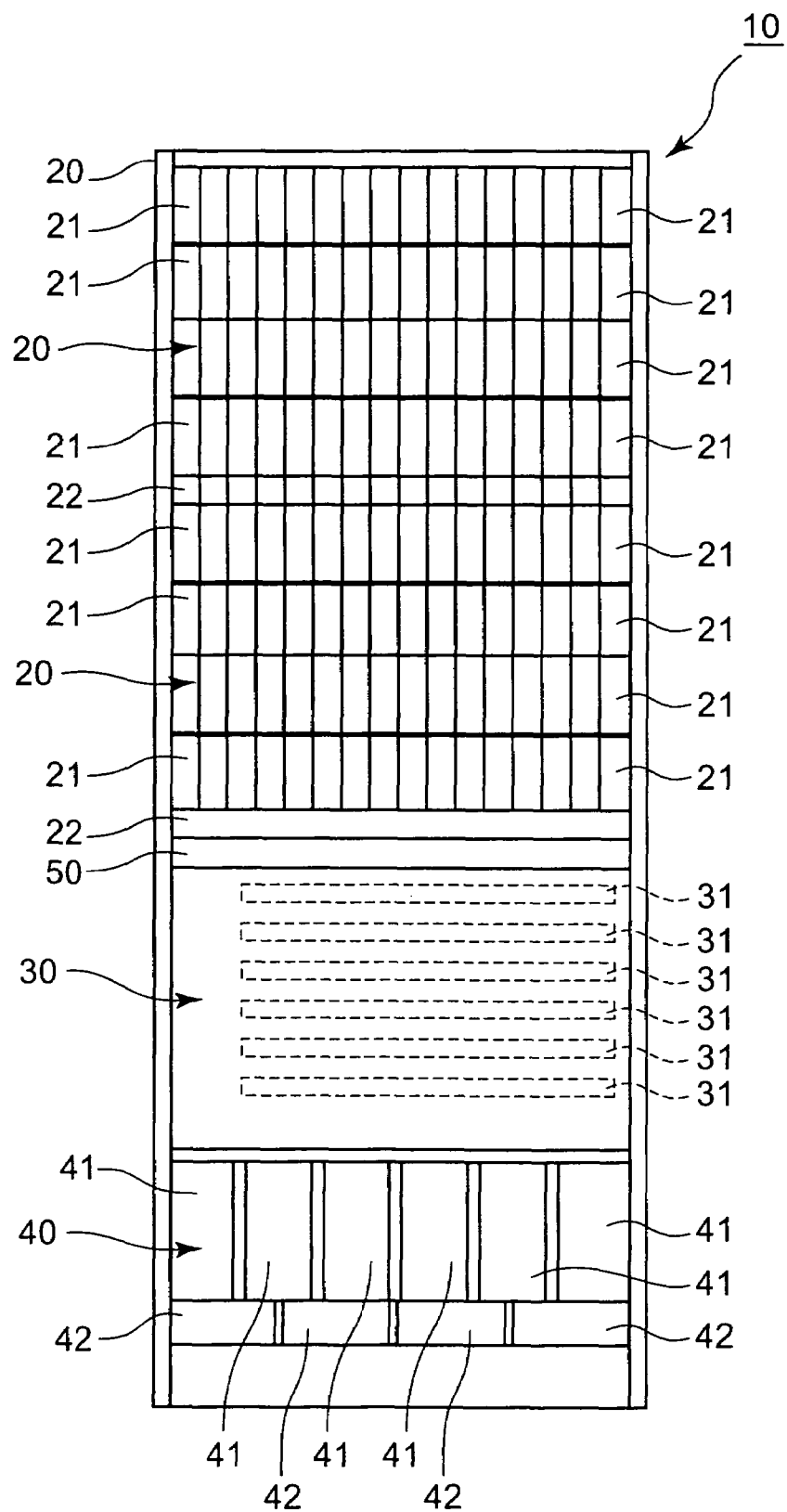
FIG. 2 is an explanatory diagram of the storage device as seen from the front surface.
Figure 3:
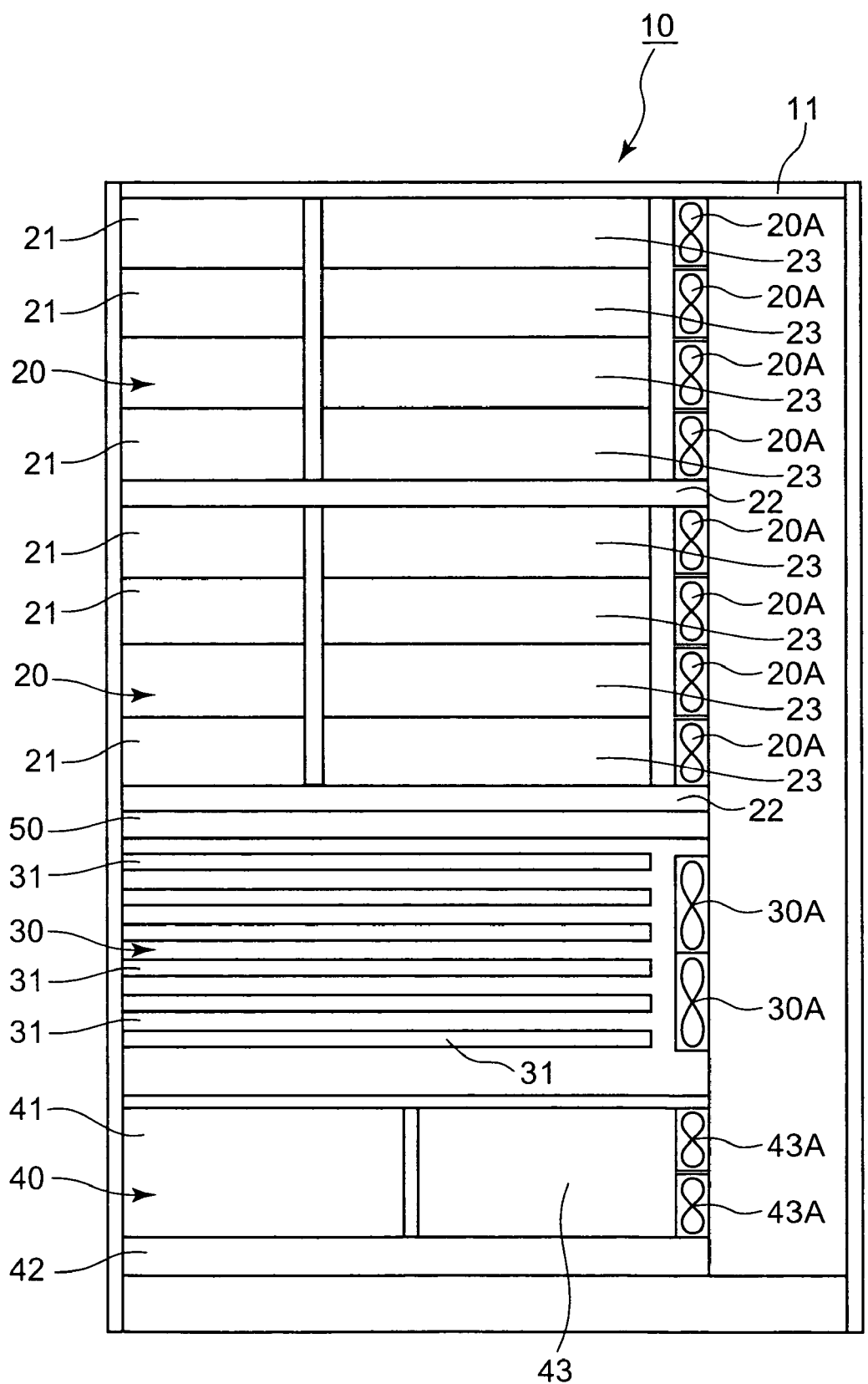
FIG. 3 is an explanatory diagram of the storage device as seen from the side surface.

FIG. 2 is an explanatory diagram which shows in model form a front view of the storage device 10, and FIG. 3 is an explanatory diagram which shows in model form a side view of the storage device 10. For example, the storage device 10 can be constructed so that this storage device 10 comprises a housing 11, a memory part 20 that is disposed inside this housing 11, a control part 30, and a device power supply part 40.

The memory part 20 can be disposed in the upper part of the housing 11. The memory part 20 is constructed from numerous disk drives 21 that are detachably mounted in the housing 11. For example, the disk drives 21 can be constructed as hard disk drives; however, these disk drives can also be constructed as semiconductor memory devices, optical disk drives, optical-magnetic disk drives or the like.

The control part 30 can be disposed in the housing 11 so that this control part 30 is positioned beneath the memory part 20. For example, a control package 31 that functions as a CHA and DKA can be detachably mounted in the control part 30.

The device power supply part 40 can be disposed in the lowermost part of the housing 11. For example, the device power supply part 40 is constructed from a plurality of AC boxes 42, a plurality of battery boxes 41 that are disposed on the upper sides of the AC boxes 42, and a plurality of AC/DC power supplies 43 (see FIG. 3) that are positioned on the upper sides of the AC boxes 42 and disposed on the rear sides of the battery boxes 41. For example, the battery boxes 41 can be constructed as lead secondary cells, lithium secondary cells or the like, and comprise a plurality of battery cells. The AC boxes 42 are connected to an external alternating-current power supply, and have a breaker function. The AC/DC power supplies 43 convert the alternating-current voltage that is supplied from the AC boxes 42 into a specified direct-current voltage. Furthermore, a construction that can handle an instantaneous voltage drop may also be obtained by installing a capacitor box in the device power supply part 40.

Thin battery units 22 may also be disposed between the memory parts 20. For example, these thin battery units 22 are mounted in order to support destage processing. In the present example, no distinction is made between battery boxes 41 and thin battery units 22; these are described as battery power supplies.

A service processor (hereafter abbreviate to "SVP") 50 can be installed between the second-stage memory part 20 and the control part 30.

Reference is now made to FIG. 3. A plurality of cooling fans 20A are respectively installed on the rear surface sides of the respective memory parts 20. A plurality of cooling fans 30A are also respectively installed on the rear surface side of the control part 30. Similarly, cooling fans 43A are also respectively installed on the rear surface sides of the respective AC/DC power supplies 43. Air that is sucked in from the front surface of the housing 11 flows in toward the rear surface side while cooling the disk drives 21, control packages 31, AC/DC power supplies 43 and the like, and is then discharged to the outside of the housing 11. Furthermore, the cooling structure is not limited to air cooling; water cooling or the like may also be used.

Figure 4:
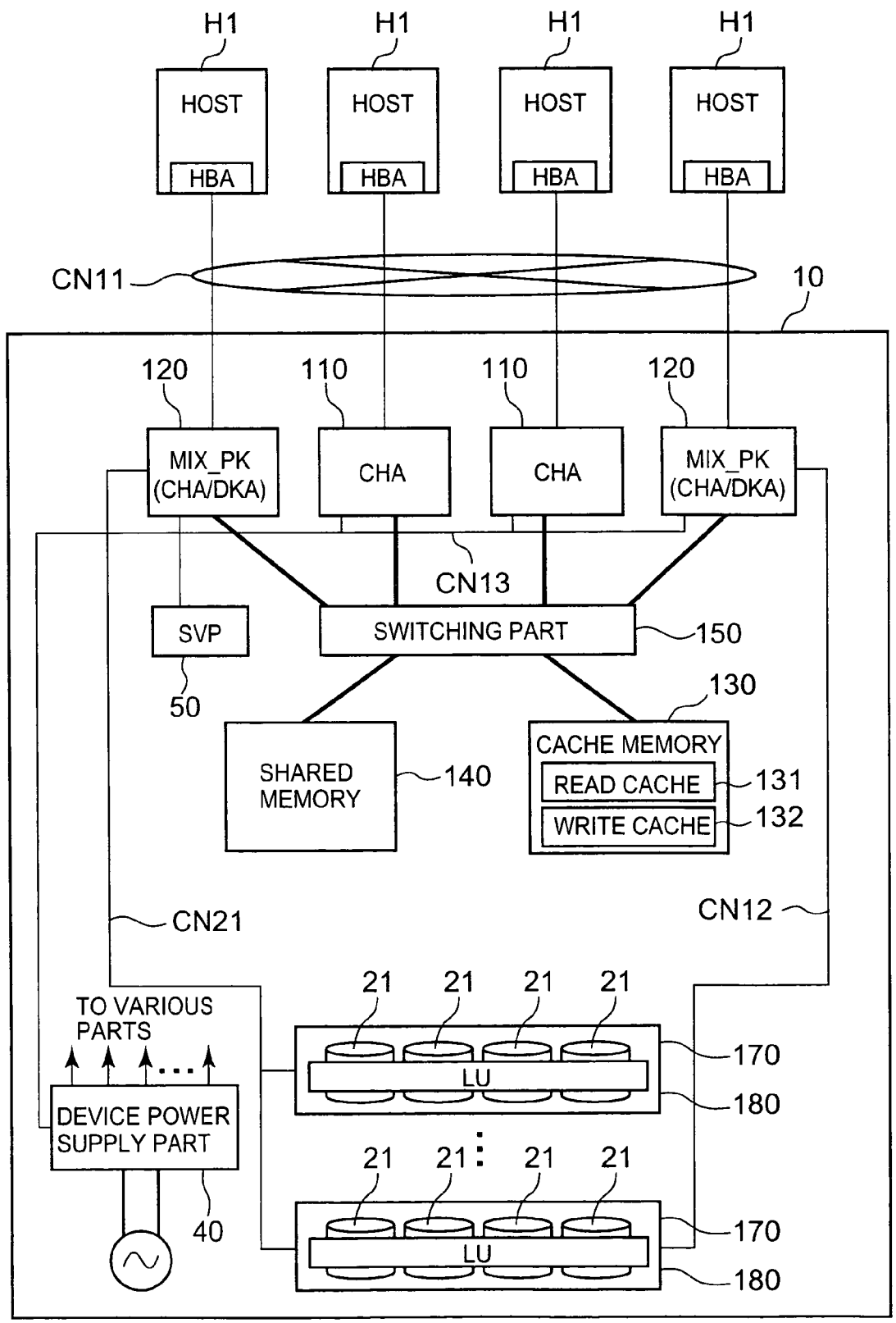
FIG. 4 is a block diagram which shows the schematic construction of the storage device.

FIG. 4 is a block diagram that focuses on the functional construction of the storage device 10. The storage device 10 can be connected to a plurality of hosts H1 via a communications network CN11. Furthermore, the hosts H1 can be divided into open type hosts and main frame type hosts.

For example, a LAN (local area network), SAN (storage area network), internet, dedicated circuit or the like can be use as the communications network CN11. In cases where a LAN is used, the transfer of data between the hosts H1 and storage device 10 is performed according to a TCP/IP (transmission control protocol/internet protocol). In cases where a SAN is used, the transfer of data between the hosts H1 and storage device 10 is performed according to a fiber channel protocol. Furthermore, in cases where the hosts H1 are main frame computers, the transfer of data is performed according to a communications protocol such as FICON (fiber connection: registered trademark), ESCON (enterprise system connection: registered trademark), ACONARC (advanced connection architecture: registered trademark), FIBARC (fiber connection architecture: registered trademark) or the like. Open type hosts perform data communications with the storage device 10 using a fiber channel protocol, SCSI (small computer system interface) or the like, and main frame type hosts perform data communications with the storage device 10 using FICON, ESCON or the like.

For example, the respective hosts H1 can be realized as computer systems such as servers, personal computers, workstations, main frames, portable information terminals or the like. The respective hosts H1 are connected with the communications ports of the storage device 10 via an HBA (host bus adapter). For example, the respective hosts H1 are connected via a separate communications network with a plurality of client terminals located in positions outside the figures. The respective hosts H1 provide a service to the respective client terminals by reading and writing data from and into the storage device 10 in response to requests from the respective client terminals.

CHAs 110 can be installed in the storage device 10. The respective CHAs 110 are dedicated packages that are used to control the exchange of data with the respective hosts H1. For example, the CHAs 110 may be prepared in accordance with the type of the host H1, as open type CHAs, main frame type CHAs and the like.

The composite package (MIX_PK) 120 realizes both a CHA function and a DKA function. This will be described in further detail later; however, the composite package 120 realizes both data communications with the hosts H1 and data communications with the disk drives 21. Composite packages 120 alone may be installed in the storage device 10, or a mixture of composite packages 120 and CHA dedicated packages 110 may be installed.

For example, the composite package 120 is connected to the respective disk drives 21 via a communications network CN12 such as an SAN or the like, and performs data transfer at the block level in accordance with a fiber channel protocol. Furthermore, the composite package 120 is connected to the hosts H1 via a communications network CN11 such as a LAN, SAN or the like in the same manner as that described in the case of the CHA dedicated packages 110. Moreover, as will be described later, the composite package 120 may also comprise an NAS (network attached storage) function.

The cache memory 130 stores write data that is written in from the hosts H1 and read data that is read out to the hosts H1. For example, the cache memory 130 can be constructed from a volatile or nonvolatile memory. In the present example, a case in which some or all of the cache memory is constructed from a volatile memory required for power supply backup is described as an example. The cache memory 130 is divided into a read cache 131 and write cache 132. Data that is read out from the disk drives 21 is stored in the read cache 131, and data whose writing has been requested by a host H1 is stored in the write cache 132. Furthermore, a redundant structure is used in the write cache 132, so that the same data can be stored in a plurality of memories.

The shared memory (or control memory) 140 can be constructed from (for example) a nonvolatile memory; however, this memory may also be constructed from a volatile memory. For example, control information, management information and the like are stored in the shared memory 140. Such information comprising control information or the like can be multiplex-managed by a plurality of shared memories 140. The shared memory 140 and cache memory 130 can be constructed as respectively separate memory packages, or the cache memory 130 and shared memory 140 can be installed in the same memory package. Furthermore, some of the memory may be used as a cache region, while another portion of the memory is used as a control region. In other words, the shared memory and cache memory can also be constructed as parts of the same memory.

The switching part 150 respectively connects the respective CHAs 110, the respective composite packages 120, the cache memory 130 and the shared memory 140. As a result, access can be gained to all of the CHAs 110, composite packages 120, cache memory 130 and shared memory 140. For example, the switching part 150 can be constructed as an ultra-high-speed cross-bus switch or the like.

The disk drives 21 are physical memory devices. For example, a RAID group 170 is constructed by one set of four disk drives 21 (although this varies according to the RAID construction and the like). Furthermore, one or more hypothetical logical units (LU: logical unit) 180 can be set in the RAID group 170. The logical units 180 are the object of access by open type hosts H1 using SCSI, a fiber channel or the like. Furthermore, in the case of main frame type hosts H1 using FiCN, ESCON or the like, logical devices (LDEV) are the volumes that are the object of access.

Furthermore, the memory resources used by the storage device 10 need not all be present inside the storage device 10. The storage device 10 can also take in and utilize memory resources that are present outside the storage device 10 as though these memory resources were memory resources of the storage device 10 itself.

The SVP 50 is respectively connected with the respective CHAs 110 and respective composite packages 120 via an internal network CN13 such as LAN. Furthermore, the SVP 50 can be connected to a management terminal outside the figures via a communications network (not shown in the figures). The SVP 50 collects the respective internal states of the storage device 10 including the states of the CHAs 110, composite packages 120 and device power supply part 40, an provides these states to the management terminal.

The device power supply part 40 supplies power via a power supply common bus to the respective parts requiring power, such as the respective CHAs 110, respective composite packages 120, cache memory 130 and the like. The power supply system inside the storage device 10 will be described later.

Figure 5:
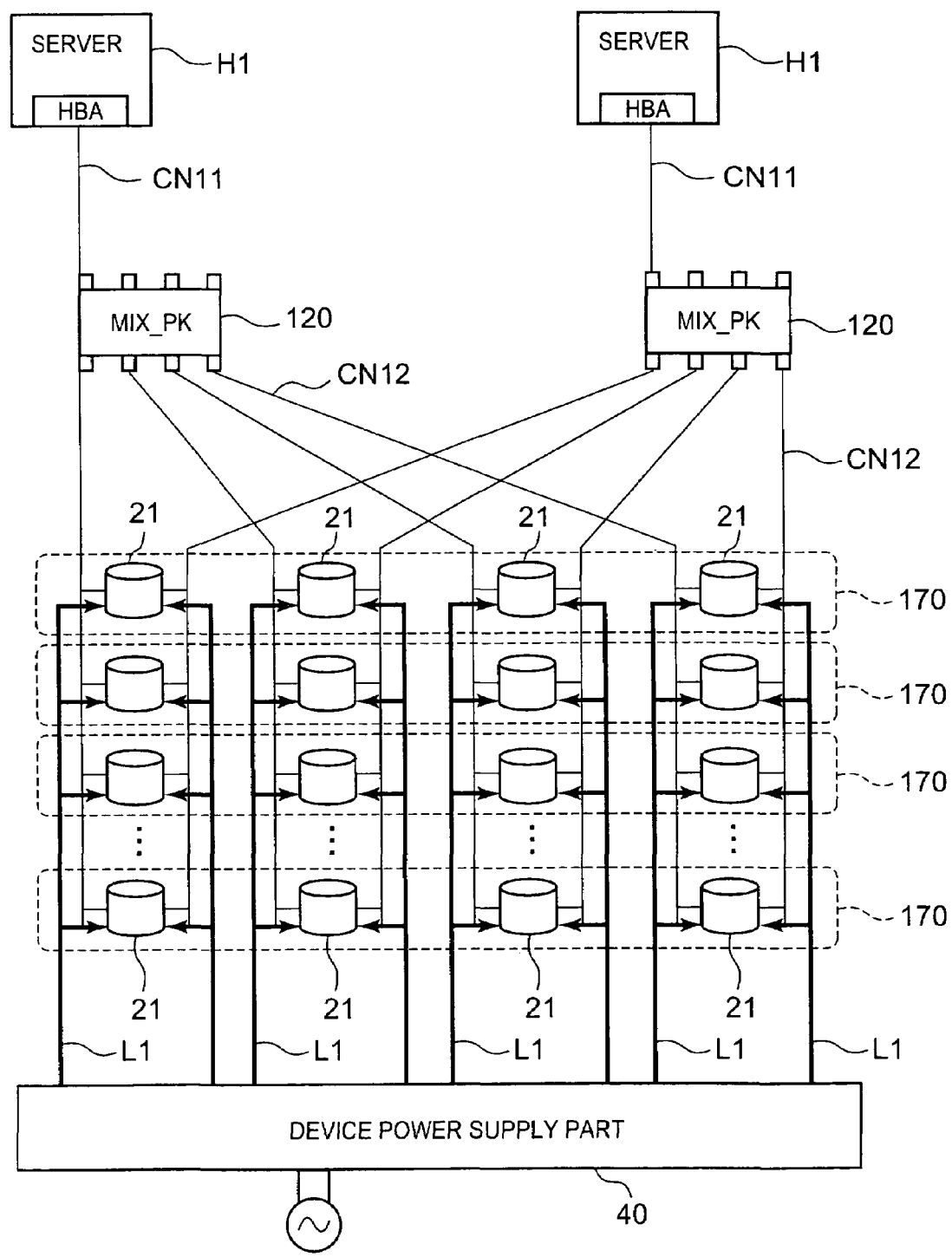
FIG. 5 is an explanatory diagram showing the connected states and the like of the disk drive and the composite packages.

FIG. 5 is an explanatory diagram which schematically illustrates the connection states of the composite packages 120, disk drives 21 and the like. The composite packages 120 may comprise a plurality of host communications ports (host communications adapters) used to connect the hosts H1, an a plurality of slave communications ports (slave communications adapters) used to connect the disk drives 21. In the figures, only a single bus is shown between the hosts H1 and storage device 10; however, a single host H1 may comprise a plurality of HBAs, and respective connections to the storage device 10 may be made via these HBAs. In cases where a single host H1 is connected to the storage device 10 via a plurality of buses, the load can be distributed by adjusting the amount of data that flows through each bus.

In FIG. 5, a total of four rows of disk drives are shown. Each row is constructed from a plurality of disk drives 21. For example, the disk drives 21 of the respective rows can be connected to the same mother board. The disk drives 21 of each row are connected to the slave communications port of a different composite package 120. Furthermore, power is supplied to the disk drives 21 of the respective rows from the device power supply part 40 via a plurality of power supply systems L1.

The RAID groups 170 are constructed straddling the rows of disk drives. Specifically, for example, one RAID group 170 is constructed from a plurality of disk drives 21 connected to respectively different mother boards.

Thus, a memory region based on RAID is constructed using disk drive groups in which the communications paths CN12 and power supply systems L1 are respectively redundant. Accordingly, even in cases where trouble such as a wire break or the like occurs in one of the communications paths 12, the disk drive group in question can be accessed via another communications path CN12. Furthermore, even in cases where trouble such as a wire break or the like occurs in one of the power supply systems L1, power can be supplied to the disk drive group in question via another power supply system L1. Furthermore, for example, in cases where data is stored redundantly on the basis of RAID 5 or the like, even if trouble should occur in one of the disk drives 21 making up a RAID group 170, the data stored in the disk drive 21 showing trouble can be recovered on the basis of the other disk drives 21 making up this RAID group 170.

Figure 6:
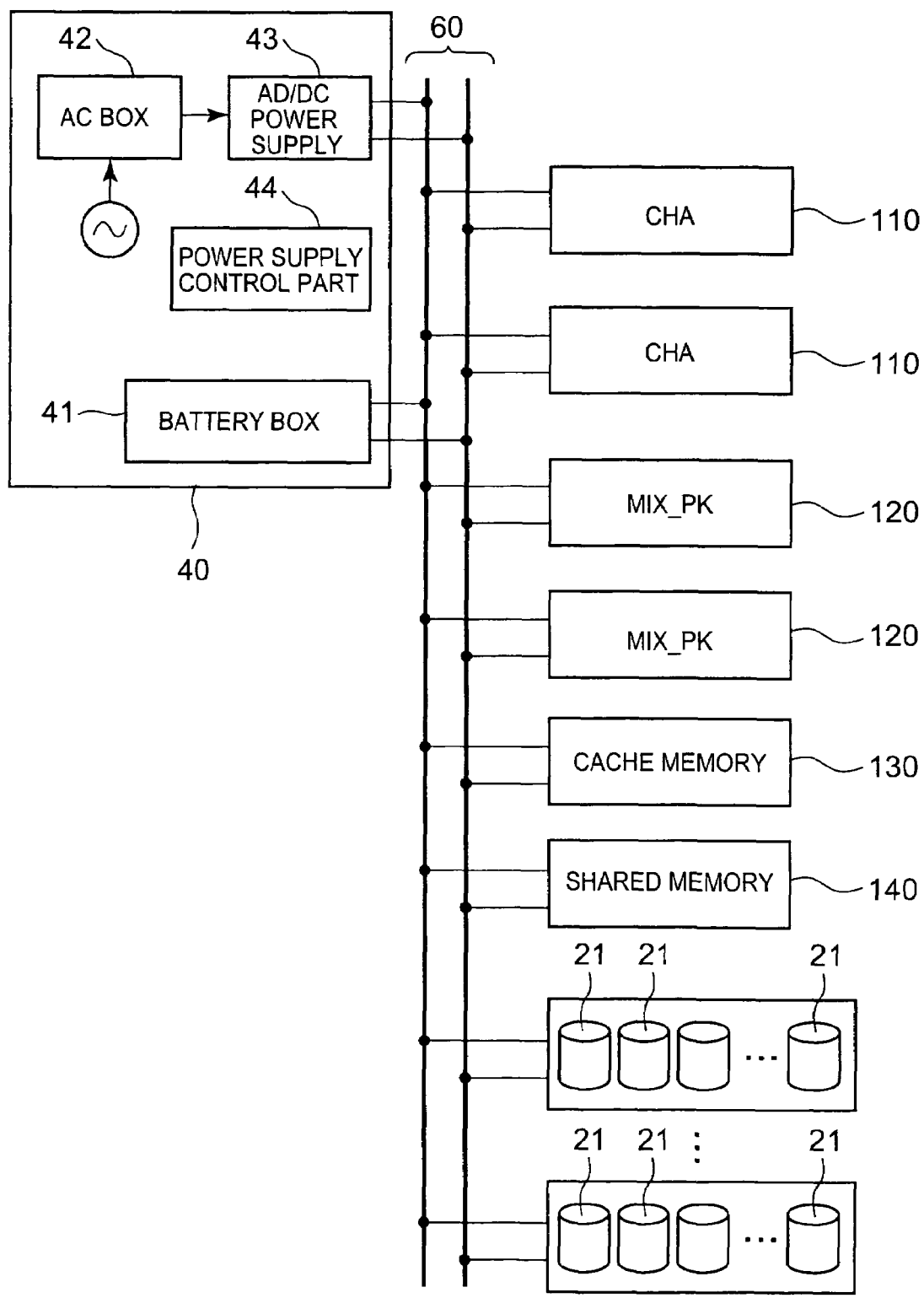
FIG. 6 is an explanatory diagram which shows in model form the power supply system of the storage device.

FIG. 6 is a schematic circuit diagram focusing on the power supply system of the storage device 10. In FIG. 6, only a single battery box 41, AC box 42 and AC/DC power supply 43 are shown; in actuality, however, as was described above, respective pluralities of these parts are installed. Each AC/DC power supply part 43 and each battery box 41 are respectively connected to the power supply common bus 60. The AC/DC power supply parts 43 convert the alternating-current voltage that is input from the AC boxes 42 into (for example) a direct-current voltage of some several tens of volts, and output this voltage onto the power supply common bus 60. The power supply control part 44 monitors the output voltage or the like of the AC/DC power supply parts 43, and switches the supply of power from the AC/DC power supply parts 43 to the battery boxes 41 in cases where the outputs of the AC/DC power supply parts 43 drop to a specified value as a result of a power outage or the like.

The respective CHA dedicated packages 110, respective composite packages 120, cache memory 130, shared memory 140 and respective disk drives 21 are arranged so that the necessary power can be obtained via the power supply common bus 60. Furthermore, although this is not shown in the figures, one or a plurality of DC/DC converters can be respectively installed inside each package, and the voltage can be adjusted using these DC/DC converters.

Figure 7:
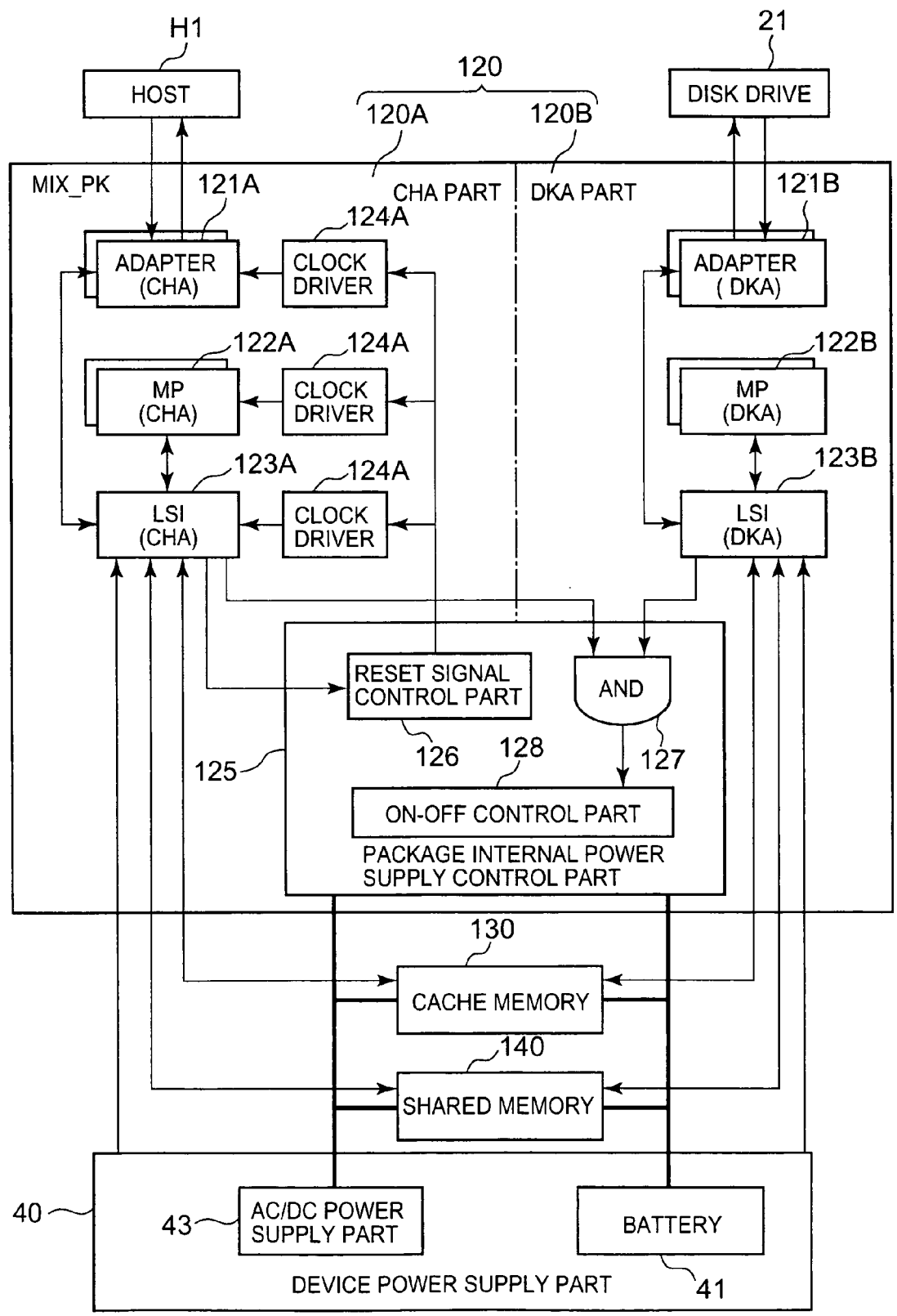
FIG. 7 is a schematic block diagram of a composite package that realizes both the function of a CHA part and the function of a DKA part.

FIG. 7 is a block diagram showing an example of the construction of the composite package 120. A CHA part 120A which controls data communications with the hosts H1 and a DKA part 120B which controls data communications with the disk drives 21 are respectively disposed in each composite package 120.

A plurality of communications adapters 121A, a plurality of microprocessors (hereafter abbreviated to "MP") 122A, and a plurality of integrated circuits (hereafter abbreviated to "LSI") 123A, are disposed in the CHA part 120A, and a clock is respectively supplied to these parts 121A through 123A via a clock driver 124A. The communications adapters 121A control the communications ports that perform communications with the hosts H1. The MPs 122A control the operation of the CHA part 120A. The LSIs 123A control the input-output of the device power supply part 40 an the like.

Like the CHA parts 120A, the DKA parts 120B also comprise a plurality of communications adapters 121B, a plurality of MPs 122B, and a plurality of LSIs 123B, and a clock is supplied from a clock driver not shown in the figures.

A package internal power supply control part (hereafter referred to as a "PK internal power supply control part") 125 is disposed in each composite package 120. The PK internal power supply control part 125 separately controls the supply of power to the CHA parts 120A and DKA parts 120B, and is used in common by the CHA parts 120A and DKA parts 120B. For example, the PK internal power supply control part 125 comprises a reset signal control part 126, an AND circuit 127, and an on-off control part 128. The reset signal control part 126 stops the clock supply by outputting a reset signal to the respective clock drivers 124A on the basis of a signal from the CHA part 120A. The AND circuit 127 outputs a power supply "off" signal to the on-off control part 128 when signals indicating that the preparations for power supply "off" have been completed are input from both the CHA part 120A and DKA part 120B. When a power supply "off" signal is input from the AND circuit 127, the on-off control part 128 switches the power supply of the composite package 120 off, and notifies the device power supply part 140 that the package 120 has been placed in a power supply "off" state.

Figure 8:
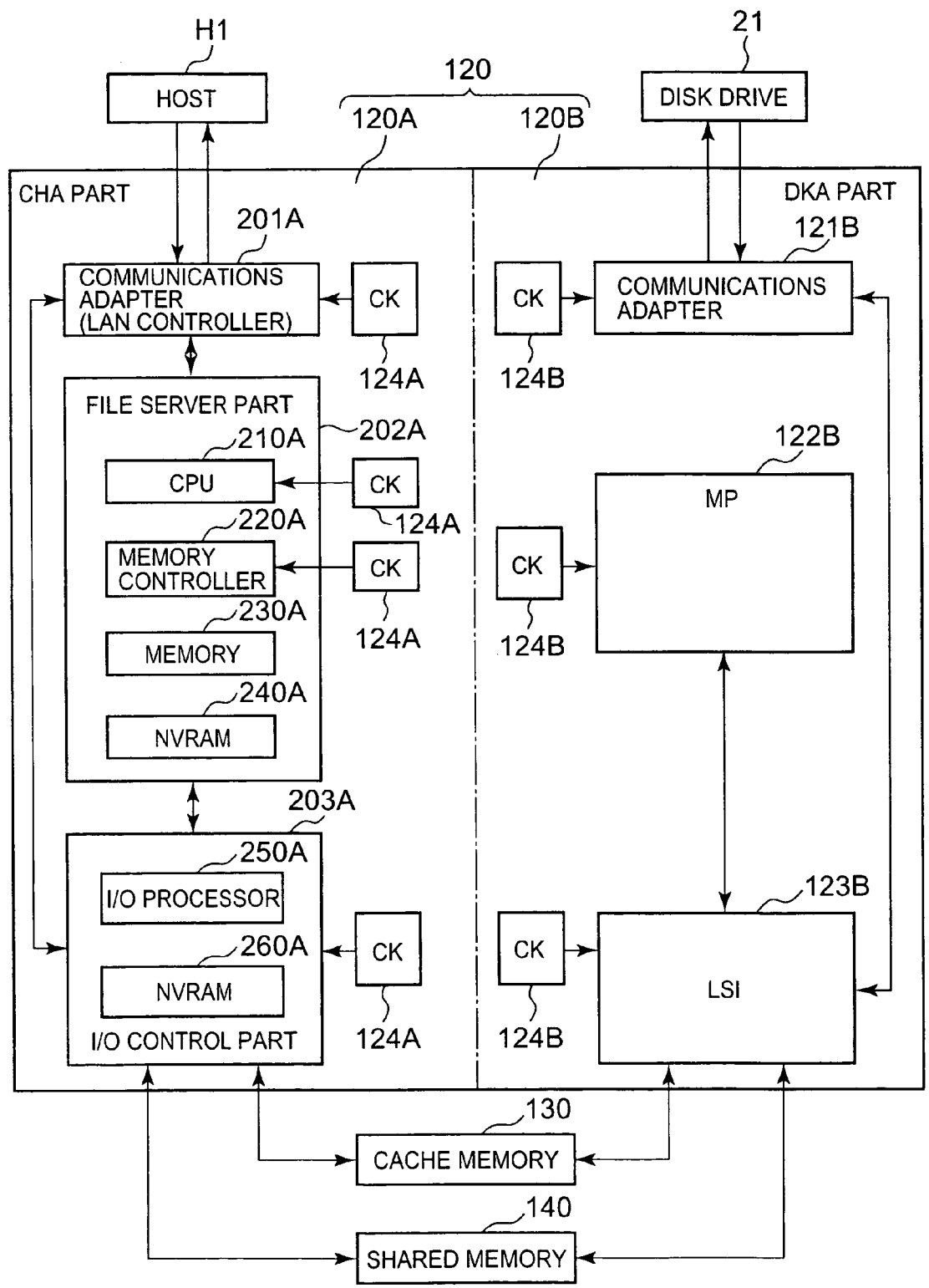
FIG. 8 is a block diagram showing a case in which an NAS function is realized in a composite package.

FIG. 8 is a schematic block diagram showing a case in which the CHA parts 120A are constructed as NAS. NAS is a computer system that is especially tailored for a file server function. In this case, a communications adapter 201A comprising a LAN controller function is provided instead of a communications adapter 121A. Furthermore, a file server part 202A is provided instead of an MP 122A. Moreover, an I/O control part 203A is provided instead of an LSI 123A.

For example, the file server part 202A can be constructed so that this part comprises a CPU (central processing unit) 210A, a memory controller 220A, a memory 230A, and a NVRAM (non-volatile RAM) 240A. For example, the I/O control part 203A can be constructed so that this part comprises an I/O (input/output) processor 250A and a NVRAM 260A. Furthermore, a specified clock is supplied from the clock driver 124A to the communications adapter 201A, CPU 210A, memory controller 220A and I/O control part 203A.

Thus, in the present example, the CHA part 120A of the composite package 120 can also be constructed as an adapter for SAN based on a fiber channel protocol, or can be constructed as an NAS based on TCP/IP.

Figure 9:
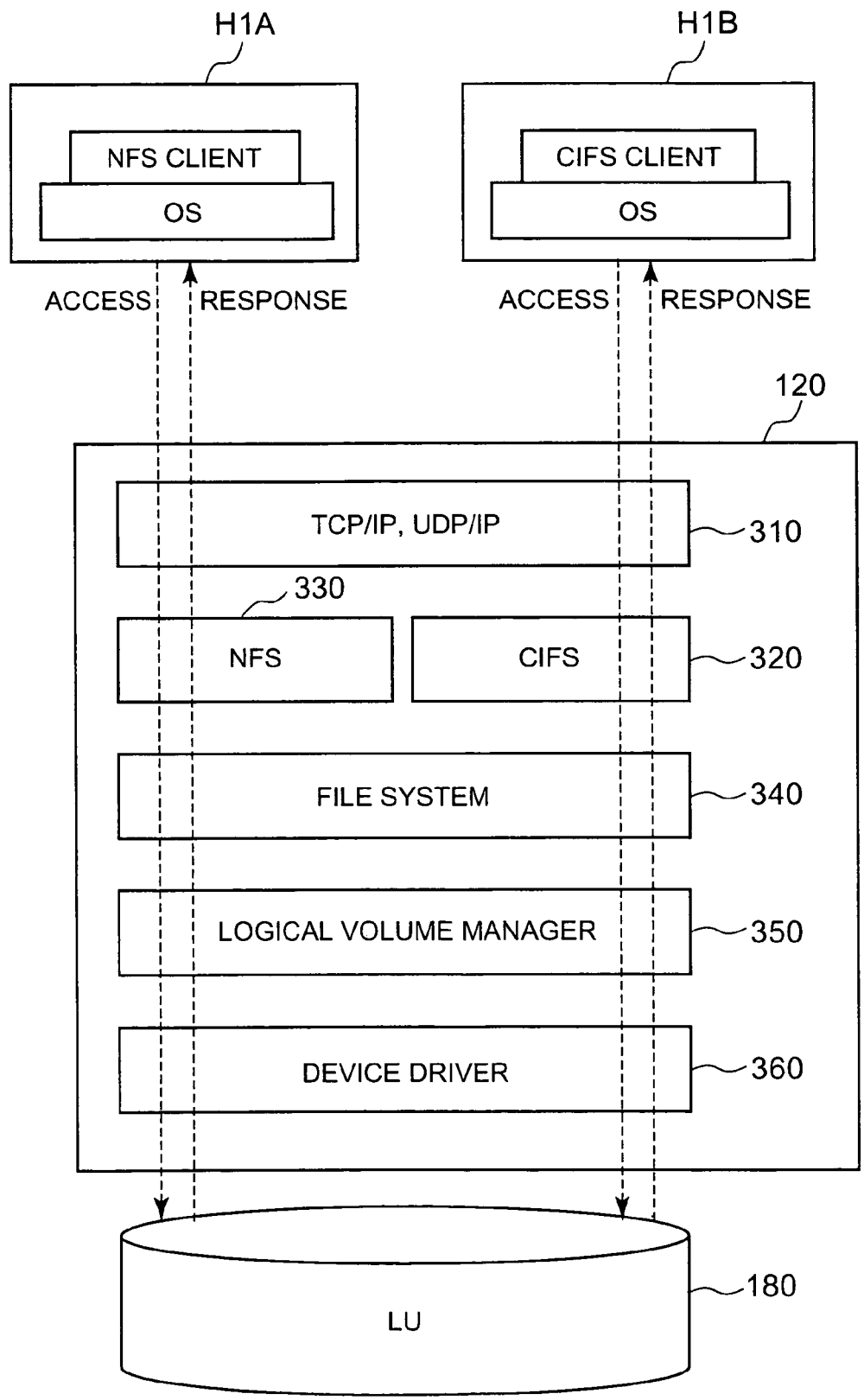
FIG. 9 is an explanatory diagram which shows in model form a software structure that is used to realize an NAS function.

FIG. 9 is an explanatory diagram showing the software structure in a case where an NAS function is installed in the composite package 120. For example, this NAS function can be realized using a network protocol layer 310, file access protocol layers 320 and 330, a file system 340, a logical volume manager (hereafter abbreviated to "LVM") 350, and a device driver group 360.

For example, the network protocol layer 310 supports a protocol such as TCP/IP, UDP/IP (user datagram protocol/internet protocol) or the like, and can send and receive data in accordance with these protocols. The file access protocol layers 320 and 330 support a protocol for file access. For example, one file access protocol 320 is NFS (Network File System: registered trademark of Sun Microsystems, Inc.); the other file access protocol 330 is CIFS (Common Interest File System). Here, in one host H1A, for example, an NFS client can be disposed on an OS such as UNIX (registered trademark of X/Open Company Limited) or the like. In the other host H1B, for example, a CIFS client can be disposed on an OS such as Windows (registered trademark of Microsoft Corporation).

The file system 340 is a program that controls the input-output of files and the like to and from the respective LUs 180, and the LVM 350 is a program that provides a management function for the LUs 180. In the case of the LVM 350, for example, a plurality of LUs 180 are bundled, and are split into volumes with a capacity that can easily be used by the user or the like. Furthermore, the LVM 350 may also comprise a snapshot function. Snapshot refers to a static image of data at a certain point in time. The snapshot function is a function that provides the memory construction at the point in time of snapshot creation as a hypothetical volume. The device driver group 360 provides data in a special file format in order to allow the higher LVM 350 to access the LUs 180 (which are the units of file access).

When the file system 340 receives commands indicating directory names and file names from the respective hosts H1A and H1B, the file system 340 converts the files requested by the respective hosts H1A and H1B into volume position information. For example, this volume position information is constructed from segment information and volume numbers in which file data is present. The file system 340 converts the files that are the object of access into volume position information, and requests data access from the LVM 350. When the LVM 350 receives an access request from the file system 340, the LVM 350 converts this into a block address on the LU 180, and transfers this address to the device driver group 360. On the basis of the block address received from the LVM 350, the device driver group 360 accesses the LU 180, and reads out the file data. The read-out file data is then transmitted to the respective hosts H1A and H1B.

Next, the operation of this example will be described. First, the basic operation of the storage device 10 will be described with a focus on the composite package 120. When the CHA part 120A receives a read command from the host H1, this read command is stored in the shared memory 140. The DKA part 120B occasionally refers to the shared memory 140, and when an unprocessed read command is discovered, data is read out from the disk drive 21 and stored in the read cache 131. The CHA part 120A reads out the data that has been transferred to the read cache 131, and transmits this data to the host H1.

Meanwhile, when the CHA part 120A receives a write command from the host H1, this write command is stored in the shared memory 140. Furthermore, the CHA part 120A stores the received data in the write cache 132. After the write data has been stored in the write cache 132, the CHA part 120A reports to the host H1 that writing has been completed. The DKA part 120B reads out the write data stored in the write cache 132 in accordance with the write command stored in the shared memory 140, and stores this read-out data on a specified disk drive 21.

Figure 10:
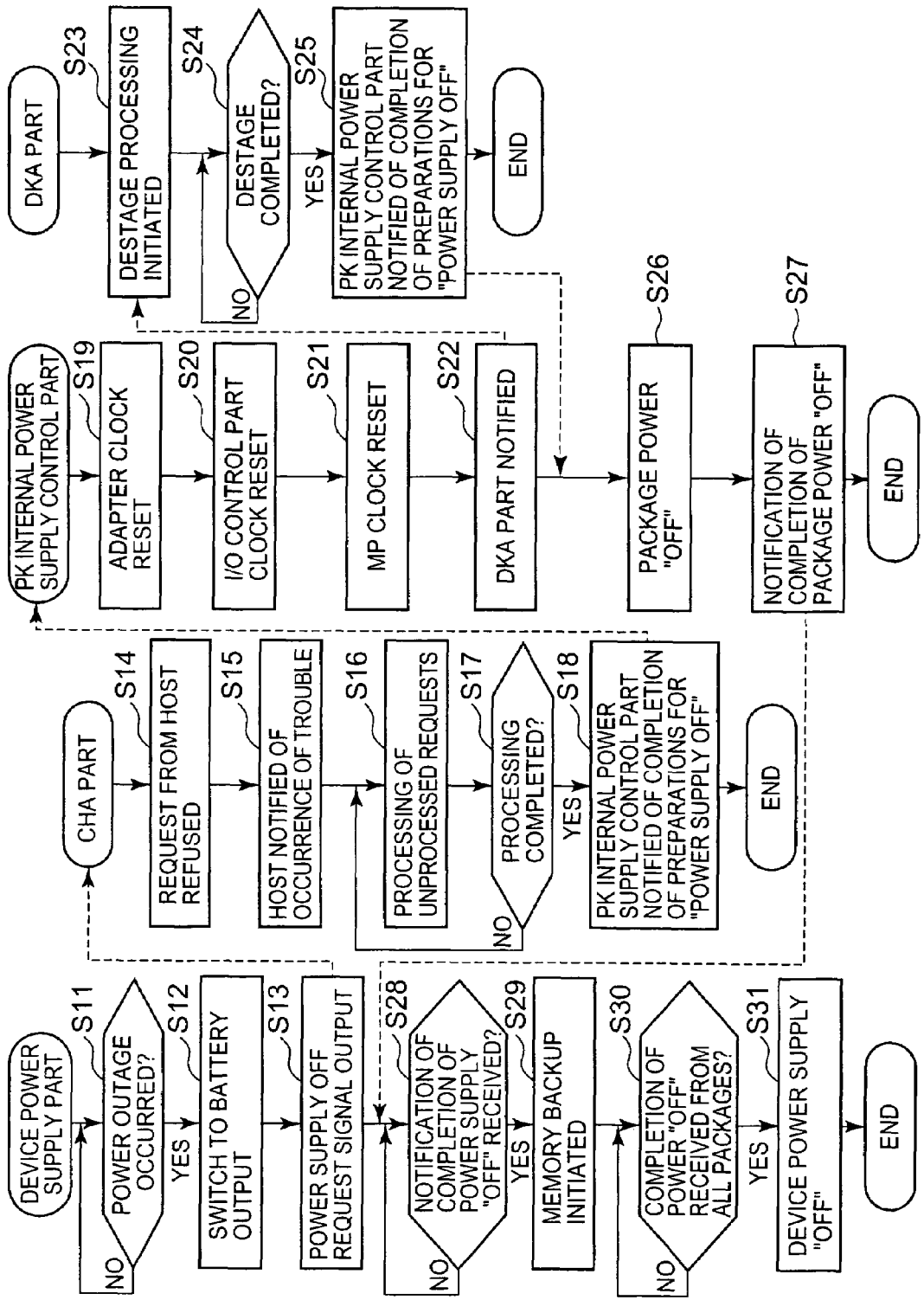
FIG. 10 is a flow chart which shows the overall operation of the storage device when power supply trouble occurs.

Next, the operation that is performed in cases where power supply trouble such as a power outage or the like occurs will be described with reference to FIG. 10. For example, the device power supply part 40 judges whether or not trouble such as a power outage or the like has occurred on the basis of the output voltage value of the AC/DC power supply 43 and the output voltage value of the AC box 42 (S11).

In cases where trouble such as a power outage or the like has occurred (S11: YES), the device power supply part 40 switches the output from the AC/DC power supply 43 to the battery power supply (S12), and outputs a power supply "off" request signal to the CHA part 120A of the composite package 120 (S13). This power supply "off" request signal that requests the lowering of the power consumption of the CHA part 120A.

When the CHA part 120A receives a power supply "off" request signal from the device power supply part 40, the CHA part 120A initiates specified end processing (S14 through S17). Specifically, the CHA part 120A rejects any new access requests from the host H1 (S14), and notifies the host H1 that trouble has occurred (S15). The host H1 receiving this notification of the occurrence of trouble interrupts access to the CHA part 120A, and thus prevents useless retry processing and the like. The CHA part 120A processes unprocessed access requests that were received from the host H1 prior to the reception of the power supply "off" request signal from the device power supply part 40 (S16). In other words, the CHA part 120A writes write data that was received from the host H1 prior to the occurrence of power supply trouble into the write cache 132. Furthermore, there is no particular need to perform read access processing. The reason for this is that it is sufficient if read commands are again transmitted by the host H1 following the recovery from power supply trouble. When all of the write data is written into the write cache 132 and end processing is completed (S17: YES), the CHA part 120A notifies the PK internal power supply control part 125 that preparations for power supply "off" have been completed (S18).

When the PK internal power supply control part 125 receives this notification of the completion of preparations from the CHA part 120A, the PK internal power supply control part 125 respectively stops the clocks supplied to the CHA part 120A via the reset signal control part 126 (S19 through S21). Specifically, the reset signal control part 126 outputs a reset signal to the clock driver 124A that supplies a clock to the communications adapter 121A, and thus stops the clock supply to this communications adapter 121A (S19). Furthermore, the reset signal control part 126 also outputs a reset signal to the clock driver 124A that supplies a clock to the MP 122A, and thus stops the clock supply to this MP 122A (S20). Furthermore, the reset signal control part 126 also outputs a reset signal to the clock driver 124A that supplies a clock to the LSI 123A, and thus stops the clock supply to the LSI 123A (S21).

After stopping the clock supply to the CHA part 120A, the PK internal power supply control part 125 requests the initiation of destage processing by the DKA part 120B (S22).

When the DKA part 120B receives a signal from the PK internal power supply control part 125, the DKA part 120B initiates destage processing (S23). Specifically, the DKA part 120B saves the write data stored in the write cache 132 by writing this data into a specified RAID group. When the destage processing is completed (S24: YES), the DKA part 120B notifies the PK internal power supply control part 125 that preparations for power supply "off" have been completed (S25).

When the AND circuit 127 of the PK internal power supply control part 125 receives respective signals indicating completion of the preparations for power supply "off" from both the CHA part 120A and DKA part 120B, the AND circuit 127 outputs a signal to the on-off control part 128. When a signal is input from the AND circuit 127, the on-off control part 128 shuts down the power supply inside the composite package 120 (S26), and notifies the device power supply part 40 that the composite package 120 has ceased to function (S27).

When the device power supply part 40 receives an indication that the composite package 120 has stopped from the PK internal power supply control part 125 (S28: YES), the device power supply part 40 initiates memory backup (S29). In memory backup processing, power is supplied only to the cache memory 130, so that the cache data is held.

When the device power supply part 40 respectively receives reports indicating that the function has been stopped from all of the packages including the composite package 120 (S30: YES), the device power supply part 40 stops the supply of power to the storage device 10 (S31). However, even in cases where the device power supply is switched off, the backup of the cache memory 130 can be continued. Furthermore, at the point in time at which cooling ceases to be necessary, the cooling fans 20A, 30A and 43A can be respectively switched off.

Figure 11:
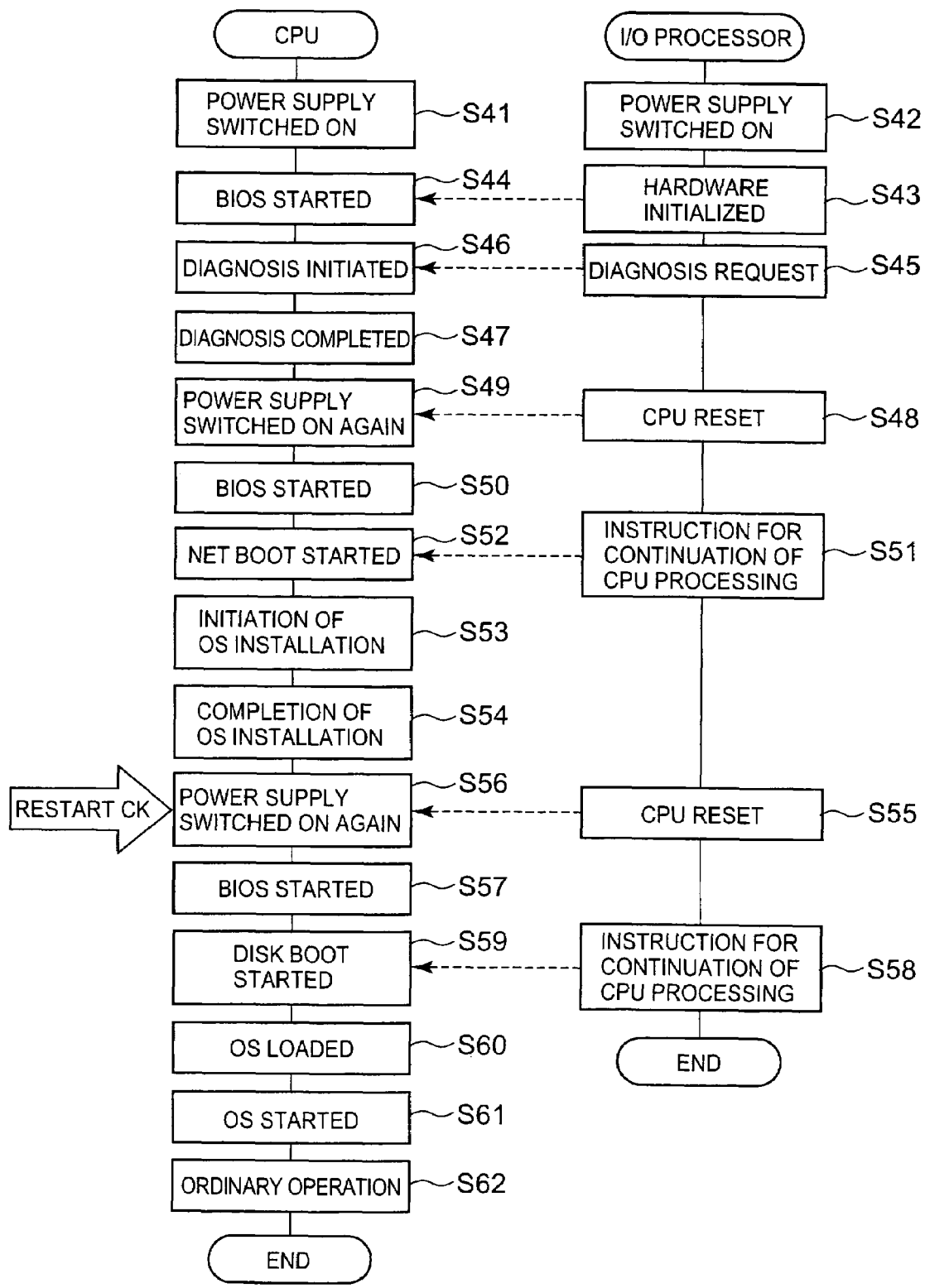
FIG. 11 is a flow chart which shows the starting sequence in a case where the CHA part of the composite package is started.

FIG. 11 is a schematic flow chart showing a portion of the starting sequence used in a case in which an NAS function is installed in the composite package 120.

First, the ordinary starting sequence will be described. After the power supplies of the CPU 210A and I/O processor 250A are respectively switched on (S41, S42), the I/O processor 250A requests initialization of the hardware by the CPU 210A (S43). As a result of this request, the CPU 210A starts the BIOS (basic input/output system) (S44) and performs a self-diagnosis in response to a diagnosis request from the I/O processor 250A (S45 through S47). Following the completion of this diagnosis, the I/O processor 250A outputs a CPU reset signal (S48).

As a result, the power supply is again switched on in the CPU 210A (S49) and the BIOS is again started (S50). The CPU 210A initiates net boot in accordance with an instruction from the I/O processor 250A (S51), and installs the OS in a specified disk drive 21 from the management terminal (S52 through S54). Next, resetting is performed in the CPU 210A in accordance with a command from the I/O processor 250A (S55, S56), and the BIOS is started (S57).

In accordance with instructions from the I/O processor 250A (S58), the CPU 210A initiates disk boot (S59), loads the OS from a specified disk drive 21 into the memory (S60), and starts the OS (S61). As a result, the CHA part 120A can initiate ordinary operation (S62).

Even in cases where the clock supply to the CHA part 120A is temporarily interrupted, processing can be restarted from S56 if a clock is again supplied to the CHA part 120A following recovery from the power supply trouble such as a power outage or the like. Accordingly, in cases where there is a recovery from the power supply trouble during the destage processing period, the function of the composite package 120 can be quickly restored merely by restarting the clock supply. Consequently, the response characteristics of the storage service can be improved. Furthermore, even in cases where the power supply of the CHA part 120A is completely stopped, the processing can be restarted from S56, since the OS has already been installed in a specified disk drive.

Since the present example is constructed as described above, this example offers the following merits. Namely, in the present example, a construction is used which is devised so that in cases where the device power supply part 40 detects power supply trouble such as a power outage or the like, the supply of power to the CHA part 120A and DKA part 120B can be separately controlled in accordance with the conditions of execution of specified end processing performed by the CHA part 120A and DKA part 120B. Consequently, the supply of power to unnecessary circuits is stopped, so that the battery power supply can be effectively utilized. Accordingly, if the battery capacity is the same, the memory backup period can be lengthened, or if the memory backup period is kept the same, the battery capacity can be reduced.

Here, it is assumed that the power consumption in the case of ordinary operation is (for example) 100 W for the CHA part 120A and 100 W for the DKA part 120B. Accordingly, the power consumption of the composite package 120 in the case of ordinary operation is 100 W+100 W=200 W. In cases where no I/O requests are generated by the hosts H1, so that the CHA part 120A waits in an unused state, the power consumption of the CHA part 120A drops to approximately 50 W. Accordingly, the power consumption of the composite package 120 in this waiting state of the CHA part is 50 W+100 W=150 W. In cases where the clock supply to the CHA part 120A is stopped, the power consumption of the CHA part 120A drops to approximately 15 W. Accordingly, the power consumption of the composite package 120 when the clock to the CHA part is stopped is 15 W+100 W=115 W. In cases where the supply of power to the DKA part 120B is stopped, the power consumption of the composite package 120 is 15 W+0 W=15 W. Furthermore, the abovementioned example of calculations shows the general trend of the power consumption; the present invention is not limited to these values.

In the present example, a construction is used which is devised so that when the specified end processing performed by the CHA part 120A is completed, the clock supply to the CHA part 120A is stopped. Accordingly, in cases where there is a recovery from the power supply trouble in a short time, the function of the CHA part 120A can be quickly restored merely by again supplying a clock or the like. Furthermore, the circuit that is used to control the clock (reset signal control part 126) can be constructed relatively simply, so that power supply control can be efficiently accomplished with little increase in cost.

2. SECOND EXAMPLE

A second example of the present invention will be described with reference to FIGS. 12 and 13. One characterizing feature of this example is that PK internal power supply control parts 125A and 125B are respectively disposed in the CHA part 120A and DKA part 120B inside the composite package 120, and that the supply of power to the CHA part 120A is stopped in cases where power supply trouble such as a power outage or the like occurs.

Figure 12:
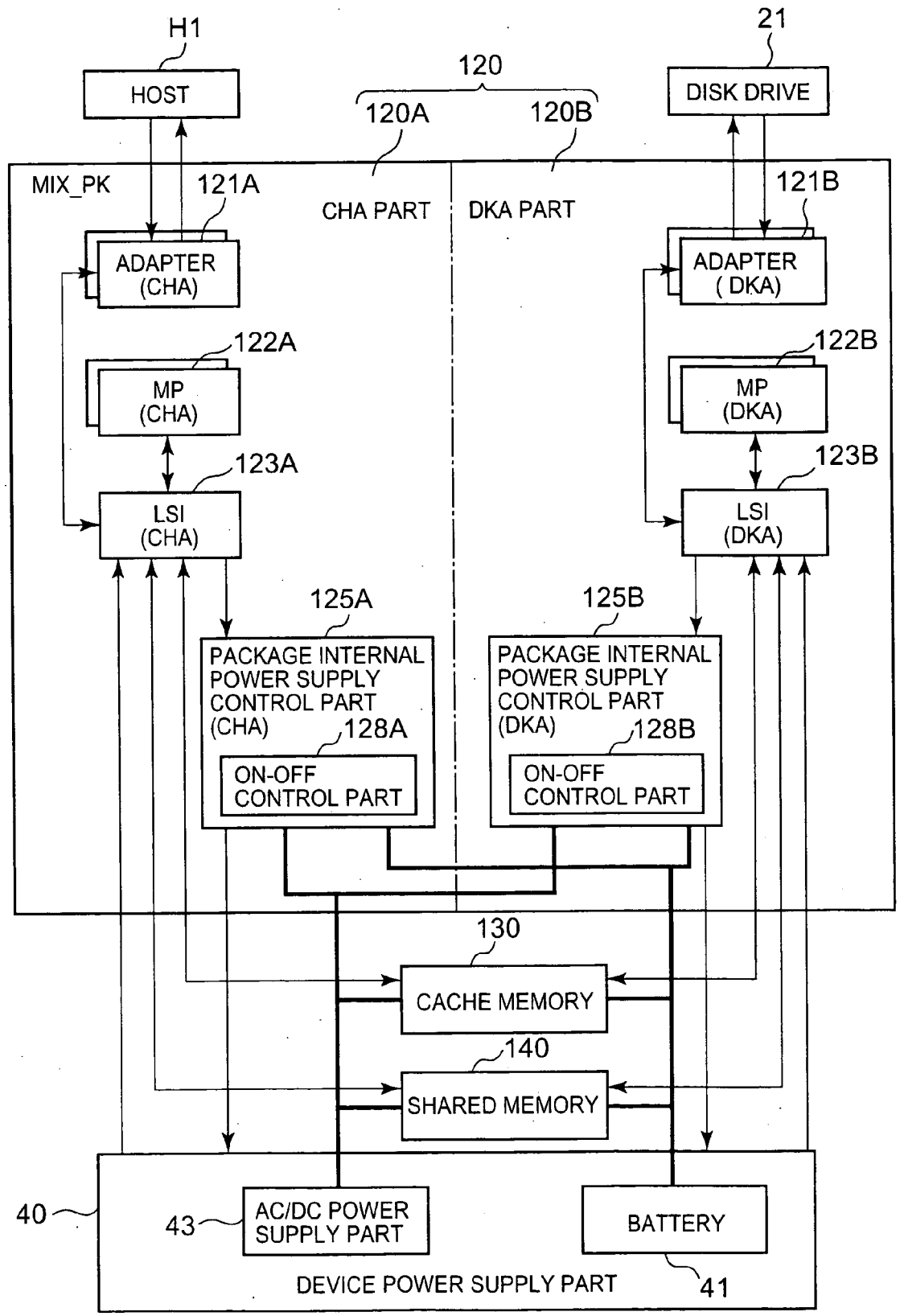
FIG. 12 is a schematic block diagram of the composite package in a second embodiment of the present invention.

FIG. 12 is a block diagram of the composite package 120 in the present example. A PK internal power supply control part 125A is disposed in the CHA part 120A. Furthermore, another PK internal power supply control part 125B is disposed in the DKA part 120B. On-off control parts 128A and 128B are disposed in the respective PK internal power supply control parts 125A and 125B, and reset signal control parts and the like are not provided. Specifically, in the present example, in cases where trouble such as a power outage or the like occurs, the clock supply is not controlled; instead, the supply of power is separately controlled in a direct manner.

Figure 13:
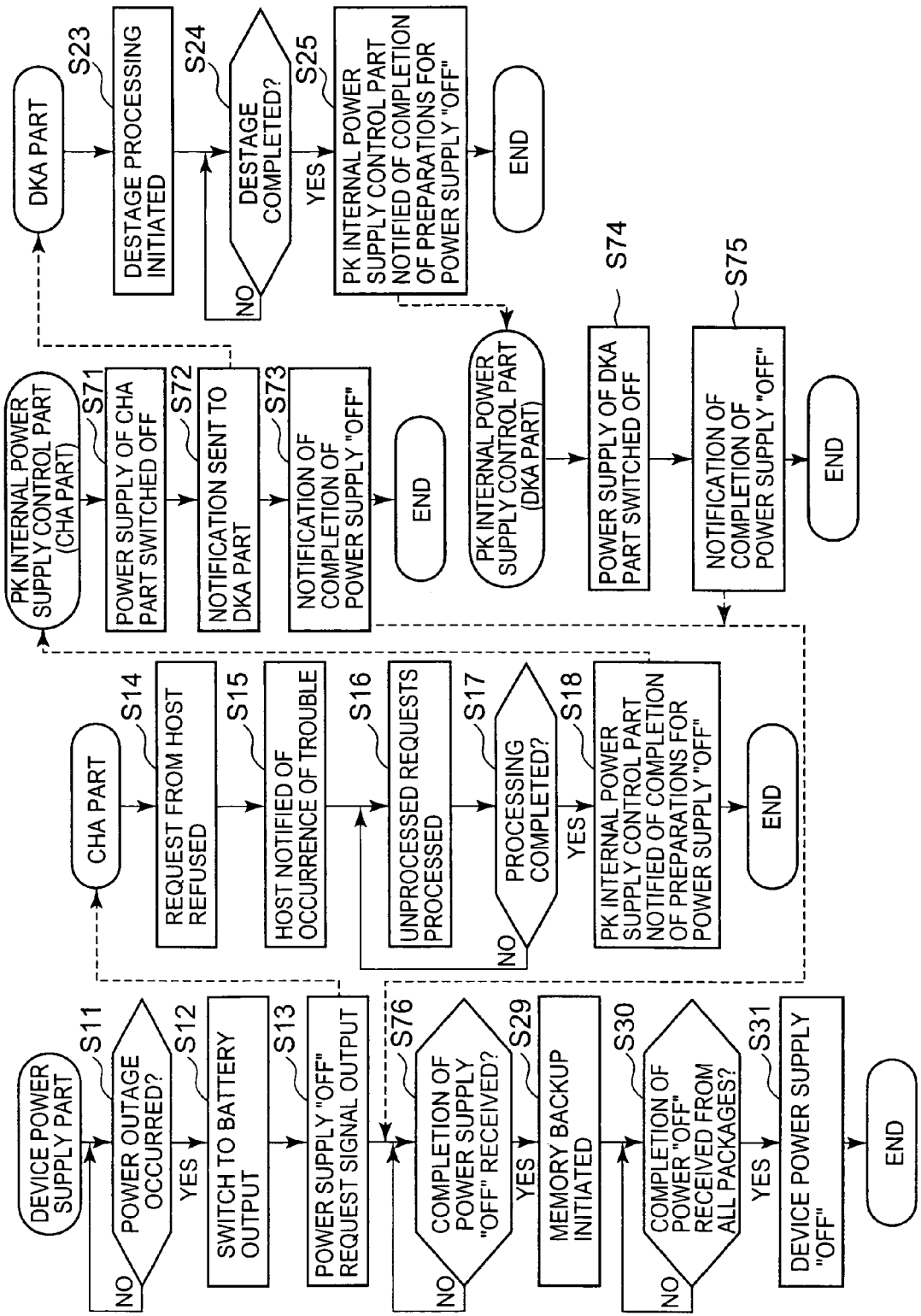
FIG. 13 is a flow chart which shows the overall operation of the storage device when power supply trouble occurs.

FIG. 13 is a flow chart that shows the operation of this example. The characterizing parts of the present example will be described, with a description of steps that duplicate steps already described with reference to FIG. 10 omitted. When the PK internal power supply control part 125A used for the CHA receives a notification of the completion of preparations for power supply "off" from the CHA part 120A, the PK internal power supply control part 125A stops the supply of power to the CHA part 120A (S71). Then, after sending an instruction for the initiation of destage processing to the DKA part 120B (S72), the PK internal power supply control part 125A notifies the device power supply part 40 that power supply "off" of the CHA part has been completed (S73).

Meanwhile, when the DKA part 120B that has completed destage processing reports the completion of preparations for power supply "off" to the PK internal power supply control part 125B (S25), the PK internal power supply control part 125B stops the supply of power to the DKA part 120B (S74), and notifies the device power supply part 40 that power supply "off" of the DKA part has been completed (S75).

When the device power supply part 40 confirms the power supply "off" of the CHA part 120A and DKA part 120B (S76: YES), the device power supply part 40 initiates memory backup and the like (S29 through S31).

Thus, PK internal power supply control parts 125A and 125B are respectively disposed in the CHA part 120A an DKA part 120B, so that the supply of power to the CHA part 120A and DKA part 120B can be separately managed.

3. THIRD EXAMPLE

A third example will be described with reference to FIGS. 14 through 18. One characterizing feature of this example is that the supply of power inside the composite package 120 is separately controlled in accordance with the degree of power supply trouble.

Figure 14:
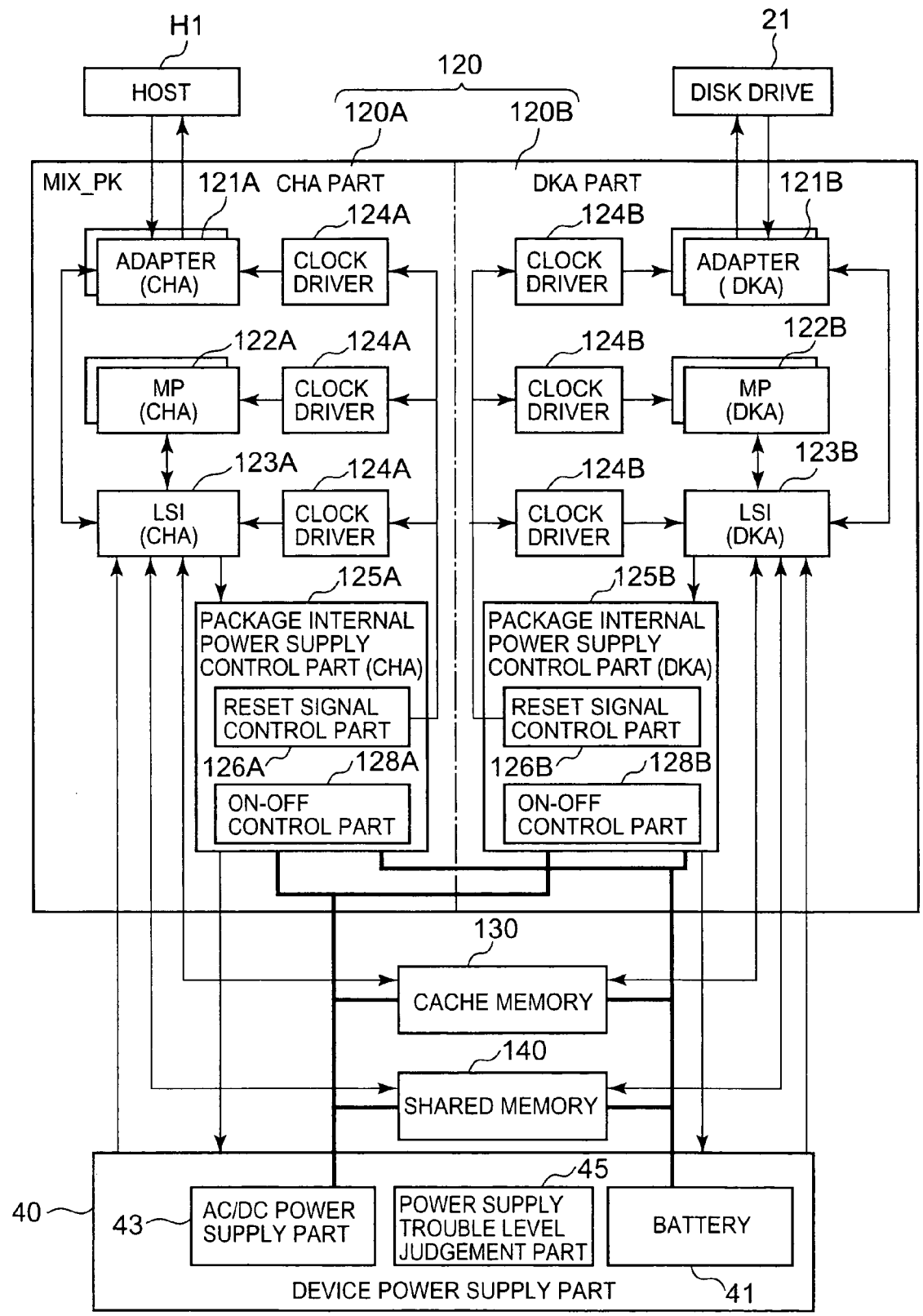
FIG. 14 is a schematic block diagram of the composite package in a third embodiment of the present invention.

FIG. 14 is a schematic block diagram of the composite package 120 of the present example. PK internal power supply control parts 125A and 125B are respectively disposed in the CHA part 120A and DKA part 120B. The respective PK internal power supply control parts 125A and 125B each comprise a reset signal control part 126A or 126B, and an on-off control part 128A or 128B. In other words, the respective PK internal power supply control parts 125A and 125B can each perform clock control.

A power supply trouble level judgement part 45 is disposed in the device power supply part 40. The method used to judge the power supply trouble level will be described further later.

Figure 15:
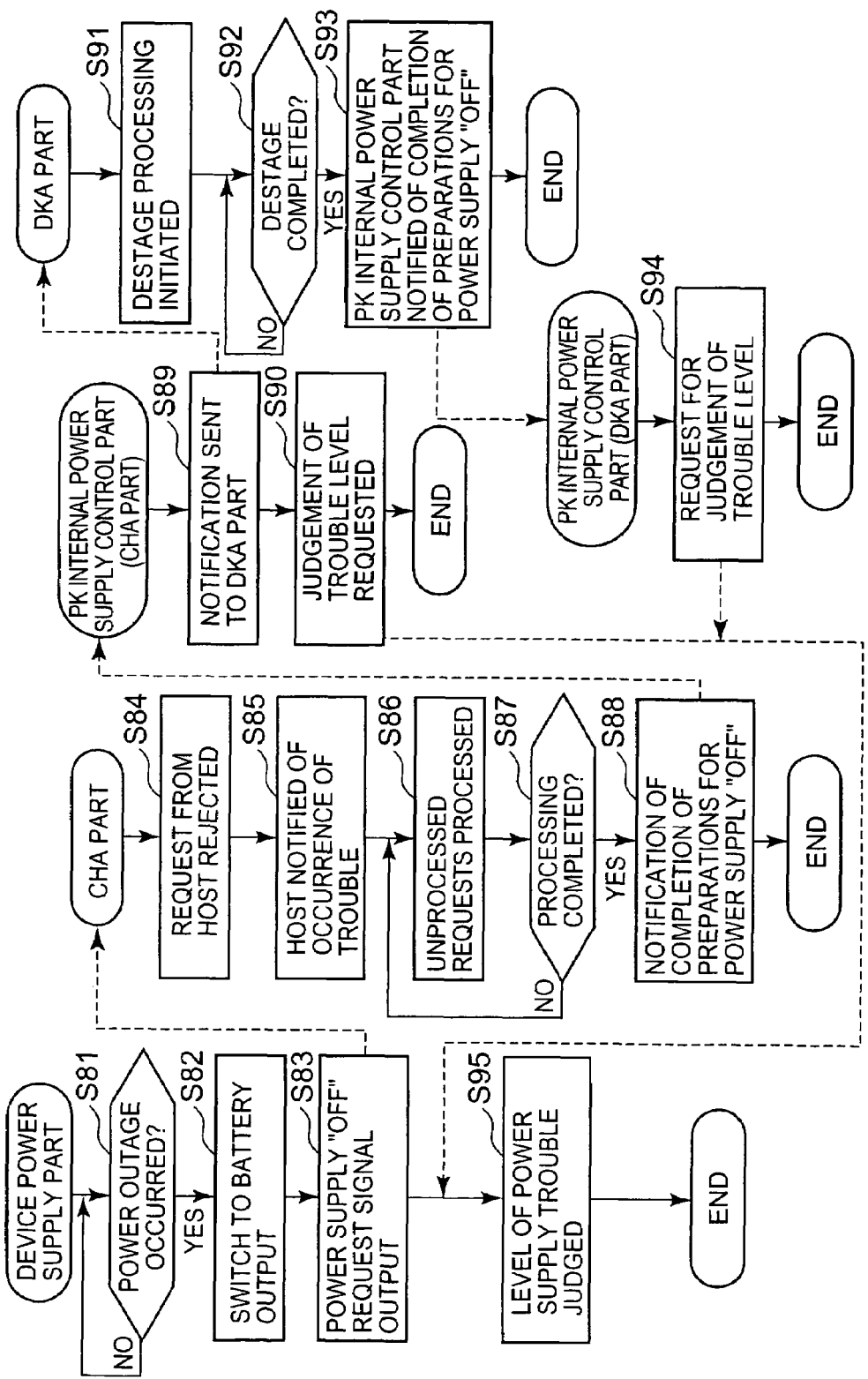
FIG. 15 is a flow chart which shows the overall operation of the storage device when power supply trouble occurs.

FIG. 15 is a flow chart showing a case in which power supply trouble such as a power outage or the like has occurred. When the device power supply part 40 detects the occurrence of a power outage or the like (S81: YES), the supply of power is switched from the AC/DC power supply 43 to the battery power supply (S82), and a power supply "off" request signal is output to the CHA part 120A (S83).

When the CHA part 120A receives a power supply "off" request signal, the CHA part 120A rejects access requests from the host H1 (S84), and notifies the host H1 that trouble has occurred (S85). Then, after writing the unprocessed write data into the write cache 132 (S86 and S87), the CHA part 120A notifies the PK internal power supply control part 125A that preparations for power supply "off" have been completed (S88).

When the PK internal power supply control part 125A receives this notification from the CHA part 120A, the PK internal power supply control part 125A instructs the DKA part 120B to initiate destage processing (S89). Nest, the PK internal power supply control part 125A requests the trouble level judgement results from the device power supply part 40 (S90).

Meanwhile, after completing destage processing (S91, S92), the DKA part 120B notifies the PK internal power supply control part 125B that preparations for power supply "off" have been completed (S93). Then, when the PK internal power supply control part 125B receives this notification, the PK internal power supply control part 125B requests the trouble level judgment results from the device power supply part 40 (S94).

In cases where the trouble level judgement results are requested from the CHA part 120A and/or DKA part 120B, the device power supply part 40 judges the level of the power supply trouble detected in S81 (S95). In this example, the level of the power supply trouble is judged in two grades, i.e., slight trouble and serious trouble. For example, slight trouble refers to trouble offering prospects of recovery in a relatively short period of time, while serious trouble refers to trouble refers to trouble that would appear to require a relatively long time for recovery.

Figure 16:
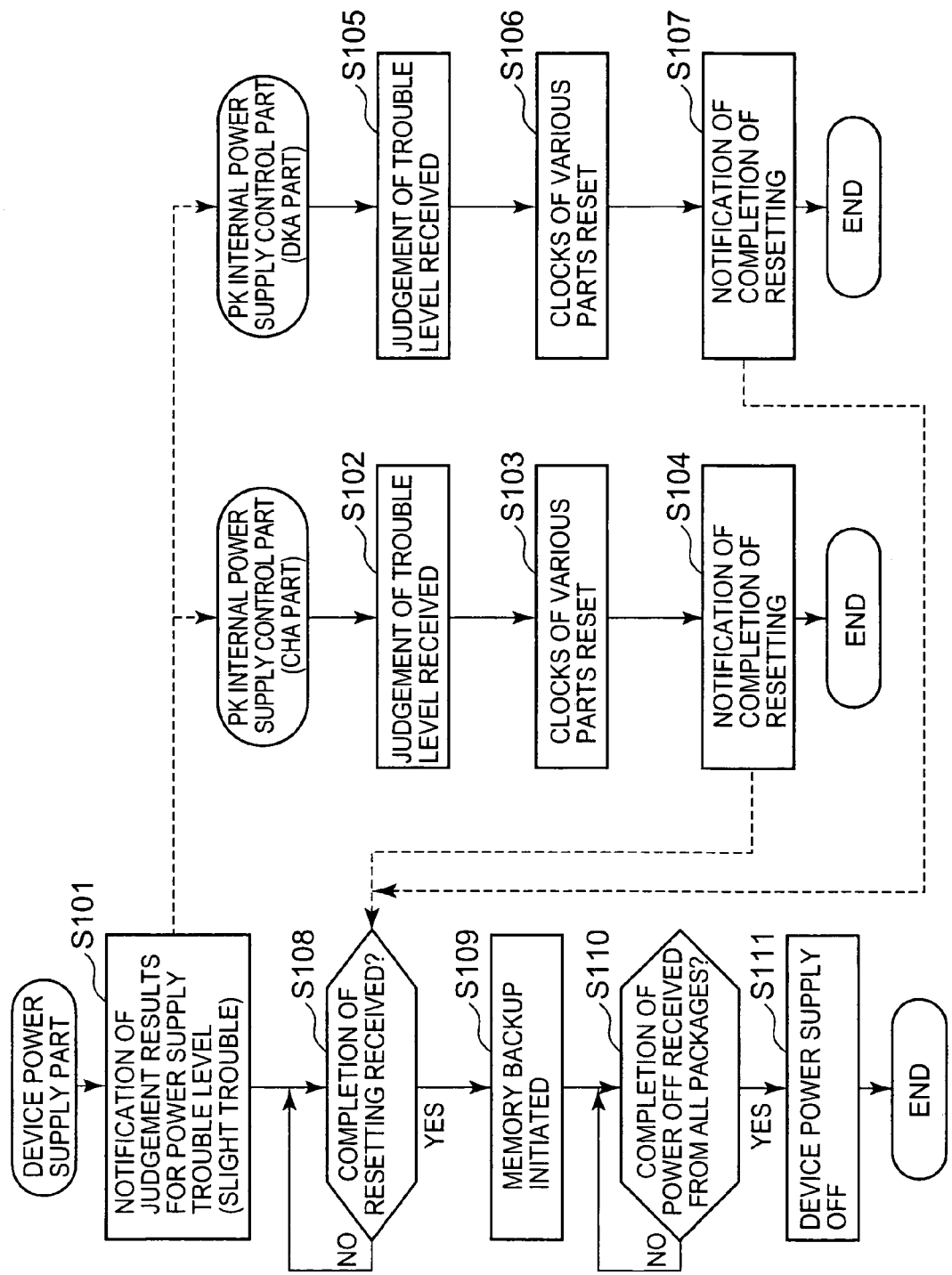
FIG. 16 is a flow chart which shows the power supply control in a case where there is a slight degree of trouble.

FIG. 16 shows the power supply control processing that is performed in a case where it is judged that the power supply trouble is slight trouble. The device power supply part 40 respectively notifies the CHA part 120A and DKA part 120B of the power supply trouble level judgement results ("slight trouble" in this case) (S101).

When the PK internal power supply control part 125A receives notification that the trouble is slight trouble (S102), the PK internal power supply control part 125A respectively stops the clock supply to specified respective parts of the CHA part 120A (S103), and reports the completion of resetting (i.e., the stopping of the clock supply) to the device power supply part 40 (S104).

When the PK internal power supply control part 125B on the DKA side receives judgement results indicating that the trouble is slight trouble at approximately the same time as the PK internal power supply control part 125A on the CHA side (S105), the PK internal power supply control part 125B respectively stops the clock supply to specified respective parts (communications adapter, MP, LSI) of the DKA part 120B (S106), and reports the completion of resetting to the device power supply part 40 (S107).

When the device power supply part 40 receives a report of the completion of resetting from the CHA part 120A and DKA part 120B (S108: YES), the device power supply part 40 initiates memory backup (S109). Then, after power supply "off" is confirmed for all of the packages (S110: YES), the device power supply is shut down and processing is ended (S11). Furthermore, even in cases where slight trouble has occurred, the device power supply is shut down and processing is ended when the battery capacity drops below a specified value.

Figure 17:
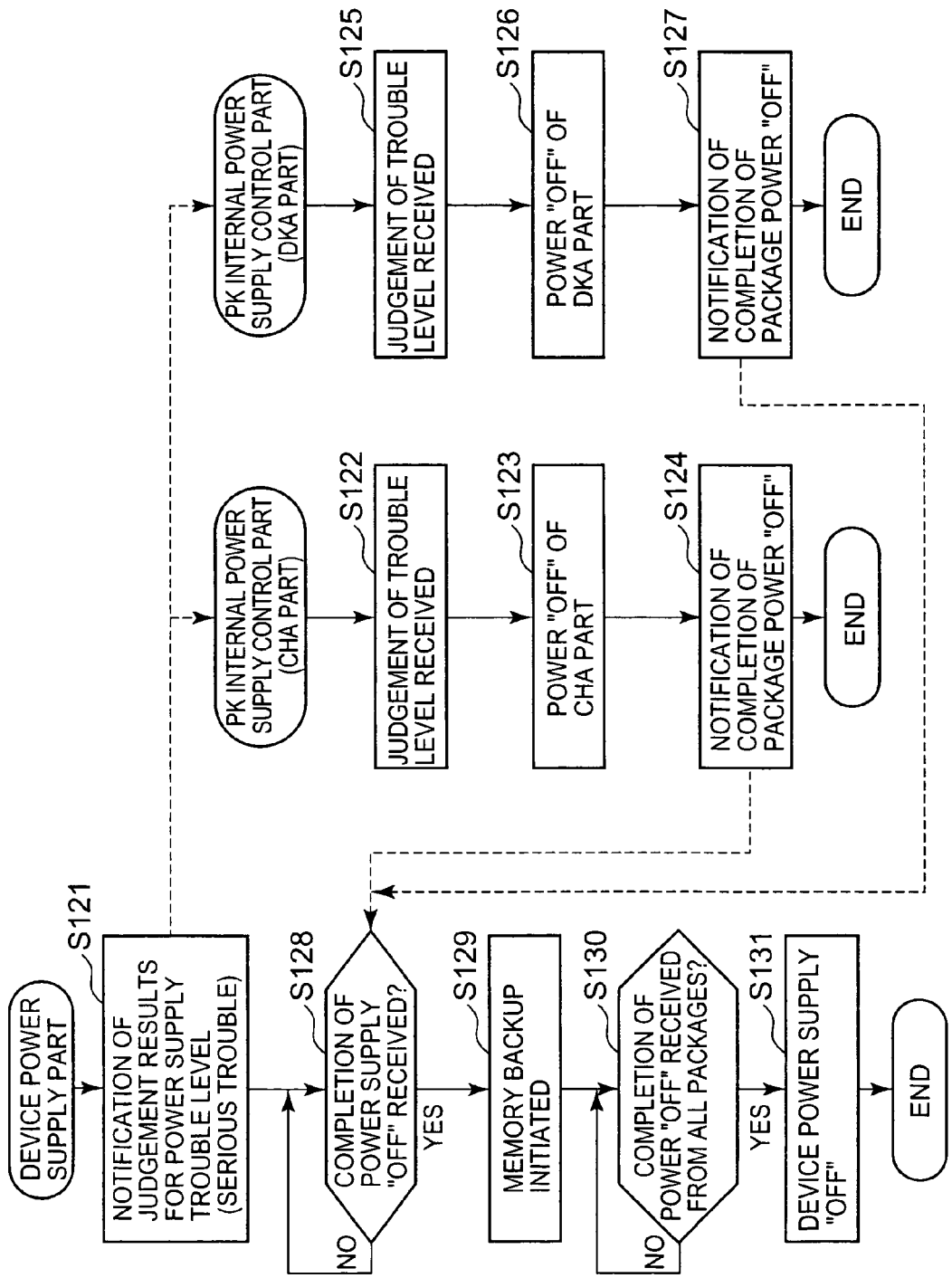
FIG. 17 is a flow chart which shows the power supply control in a case where there is a serious degree of trouble.

FIG. 17 shows the processing that is performed in a case where the trouble is judged to be serious trouble. The device power supply part 40 respectively notifies the CHA part 120A and DKA part 120B of the power supply trouble level judgement results (here, "serious trouble") (S121).

When the PK internal power supply control part 125A receives the judgement results from the device power supply part 140 (S122), the PK internal power supply control part 125A stops the supply of power to the CHA part 120A (S123), and reports the completion of power supply "off" to the device power supply part 40 (S124). Similarly, when the PK internal power supply control part 125B on the DKA side receives judgement results indicating that the trouble is serious trouble (S125), this internal power supply control part 125B stops the supply of power to the DKA part 120B (S126), and reports the completion of power supply "off" to the device power supply part 40 (S127).

Then, when the device power supply part 40 receives reports of the completion of power supply "off" from the CHA part 120A and DKA part 120B (S128: YES), the device power supply part 40 initiates memory backup (S129), and, after confirming power supply "off" for all of the packages (S130: YES), shuts down the device power supply and ends processing (S131).

Figure 18:
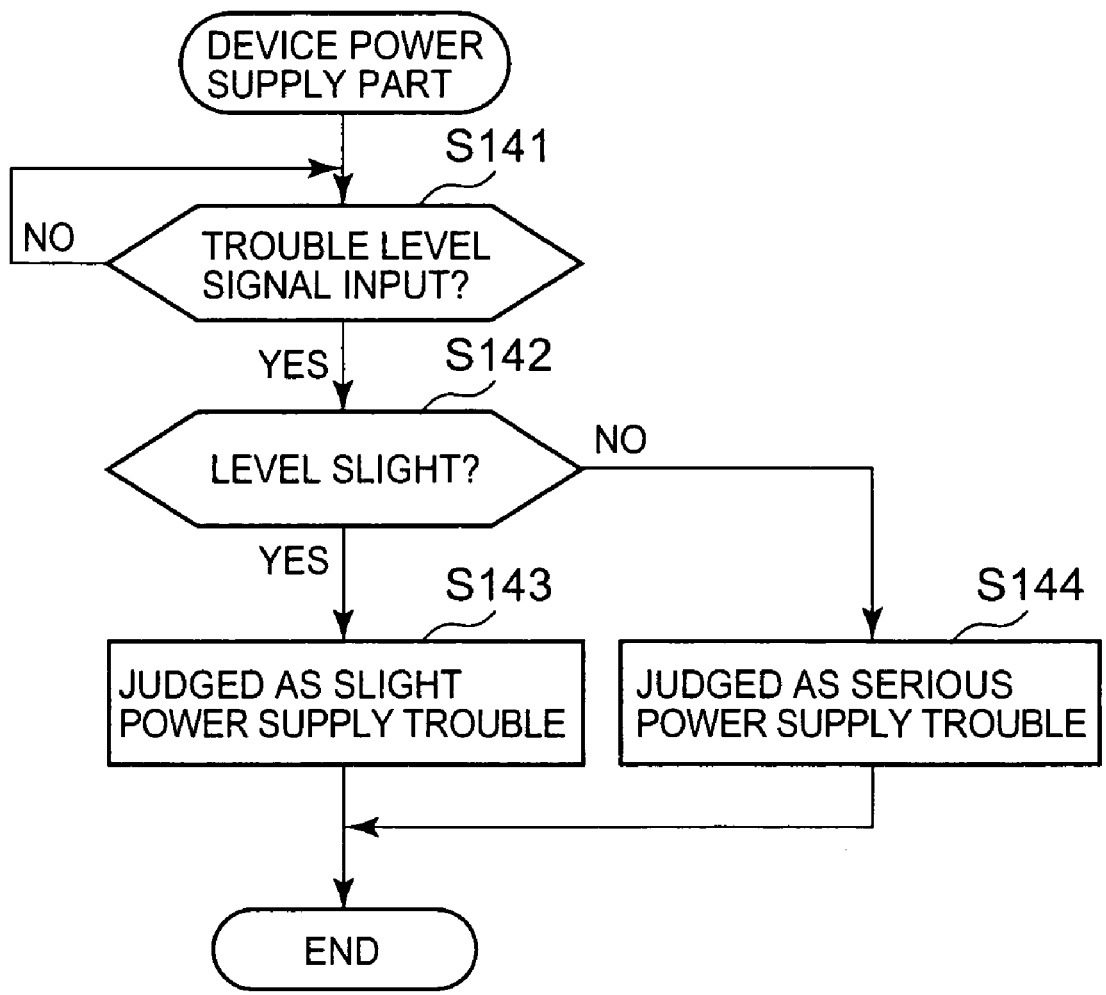
FIG. 18 is a flow chart which shows the processing that is used to determine the level of power supply trouble.

FIG. 18 is a schematic flow chart which shows the power supply trouble level judgement processing. In the present example, for instance, the system operator inputs the power supply trouble level via the management terminal or SVP 50 (S141).

In cases where information indicating that the power supply trouble is slight trouble is input by the system operator (S142: YES), the device power supply part 40 judges that the trouble is slight trouble (S143). Conversely, in cases where information indicating that the power supply trouble is serious trouble is input by the system operator (S142: NO), the device power supply part 40 judges that the trouble is serious trouble (S144).

The system operator can judge the level of power supply trouble on the basis of various types of information. For example, in cases where indoor transformer equipment, transmission paths or the like sustain major damage as a result of earthquake, fire or the like, the system operator can judge that considerable time will be required for the restoration of power supply, and can input information indicating that the trouble is serious trouble into the device power supply part 40. Furthermore, for example, in cases where it can be judged according to news reports or inquiries to power companies that the trouble is a slight power outage that can be restored in a short time, the system operator can input information indicating that the trouble is slight trouble into the device power supply part 40. Furthermore, for example, in cases where a planned power outage or power restriction during a period of abruptly increased demand is performed, the system operator can judge that the trouble is slight trouble, and can input suitable instructions into the device power supply part 40.

Thus, since the power consumption of the CHA part 120A and DKA part 120B can be separately controlled in accordance with the level of power supply trouble, the battery power supply can be used more effectively, and the memory backup period can be lengthened. Specifically, in cases where the power supply trouble is slight, the clock supply to the control packages (120A, 120B) is stopped; accordingly, the function of the storage system can quickly be recovered at the time of recovery from the power supply trouble. On the other hand, in cases where the power supply trouble is serious, the supply of power to the control packages is stopped; accordingly, consumption of the battery power supply can be suppressed, so that the battery power supply can be effectively used.

4. FOURTH EXAMPLE

Figure 19:
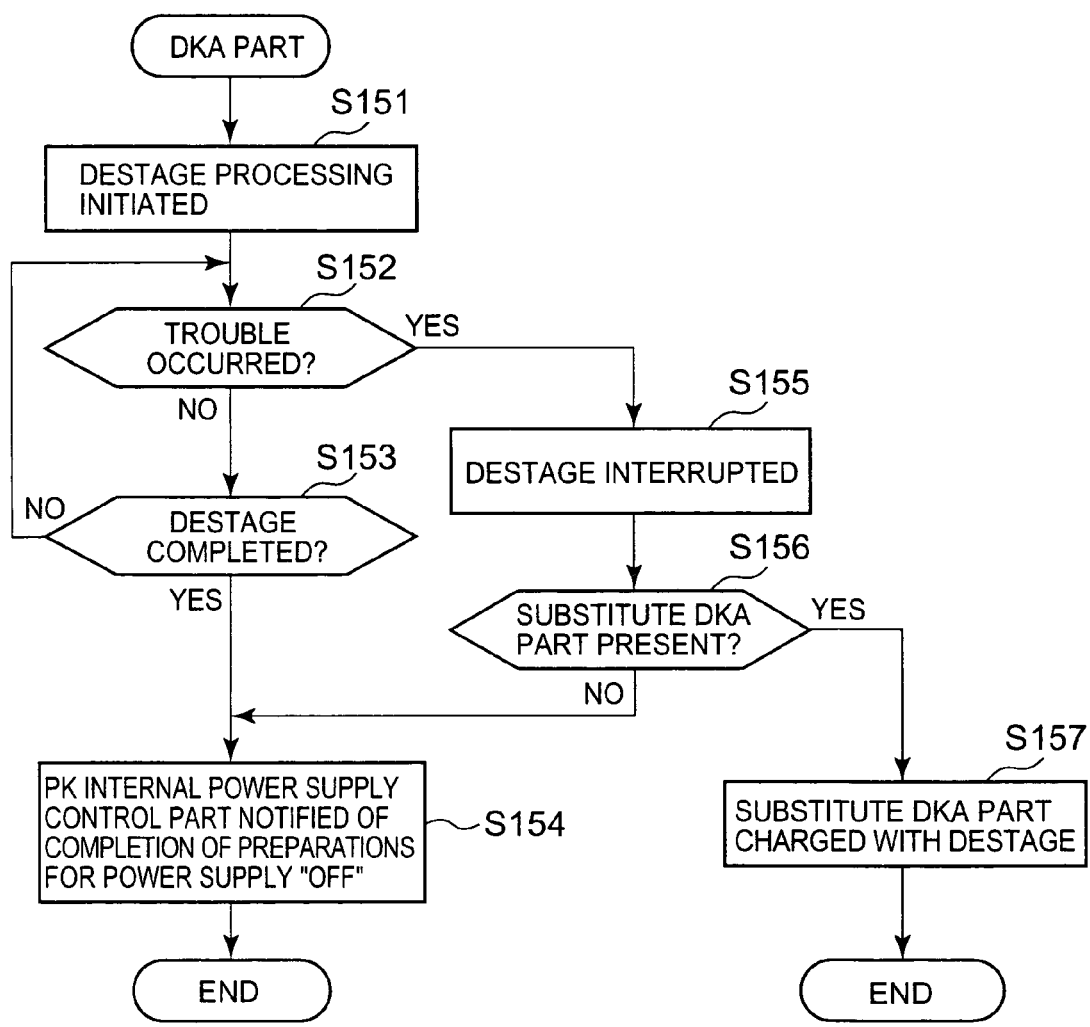
FIG. 19 is a flow chart which shows the processing that detects the substitution destination of destage processing in a fourth embodiment of the present invention.

A fourth example will be describe with reference to FIG. 19. One characterizing feature of this example is that in cases where trouble occurs during destage processing, another DKA part is charged with performing destage processing.

FIG. 19 shows the processing that is performed in a case where trouble occurs during destage processing. After destage processing is initiated (S151), a judgement is made as to whether or not trouble has occurred (S152). In cases where no trouble has occurred during destage processing (S152: N0, S153: YES), the PK internal power supply control part is notified that preparations for power supply "off" have been completed (S154). As a result, the device power supply part 40 initiates memory backup.

On the other hand, in cases where trouble has occurred during destage processing (S152: YES), the destage processing of the DKA part 120B involved in this trouble is interrupted (S155), and a judgement is made in order to ascertain whether or not a DKA part 120B that can perform destage processing as a substitute exists (S156). In cases where a DKA part 120B that can act as a substitute is detected (S156: YES), the destage processing is restarted by this DKA part 120B. In cases where no substitutable DKA part 120B can be found (S156: NO), the destage processing is left interrupted, and the completion of preparations for power supply "off" is reported to the device power supply part 40 (S154). The device power supply part 40 then initiates memory backup.

5. FIFTH EXAMPLE

A fifth example will be described with reference to FIG. 20. One of the characterizing features of this example is that power is supplied to the write cache 132 during destage processing, while the supply of power to the read cache 131 is stopped.

FIG. 20 shows an outline of the circuit construction of the cache memory 130 (memory package). For example, the cache memory 130 can be constructed so that this cache memory 130 comprises a read cache region 131, write cache region 132, power supply control module 133, and adapter 134 used to perform communications with the composite package 120 and the like via the switching part 150.

Figure 20A:
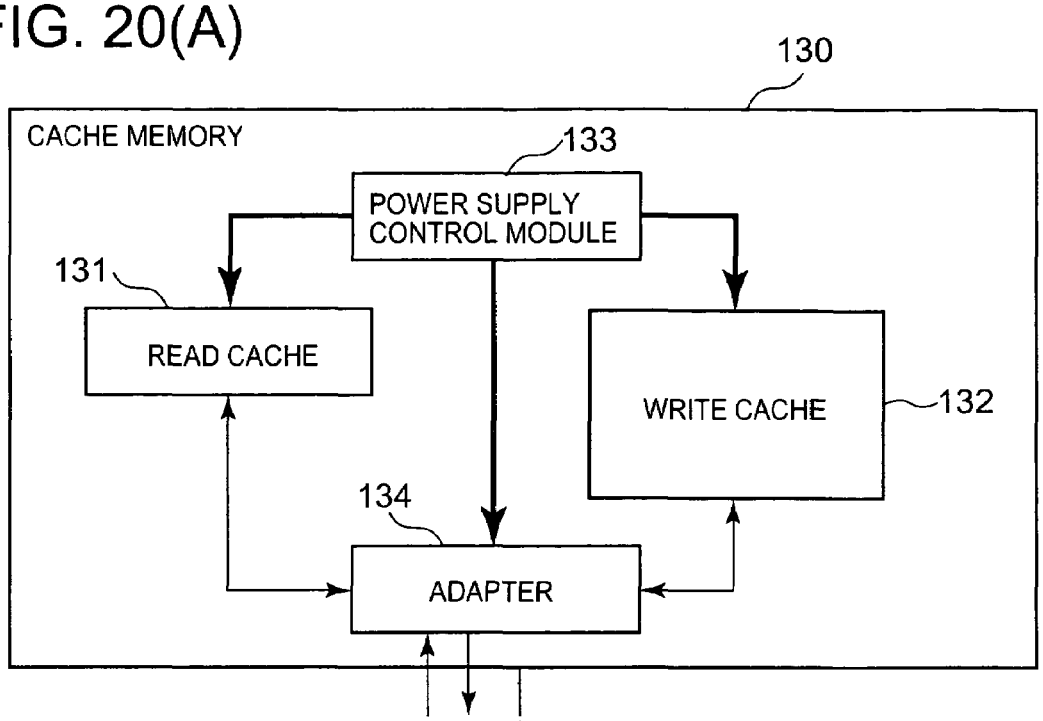
FIG. 20 is an explanatory diagram which shows in model form the power control inside the cache memory package during destage processing in a fifth embodiment of the present invention, with FIG. 20A showing the ordinary state, and FIG. 20B showing a state in which power supply trouble has occurred.

As is shown in FIG. 20A, in an ordinary state, the power supply control module 133 respectively supplies a specified power to the read cache 131, write cache 132 and adapter 134.

Figure 20B:
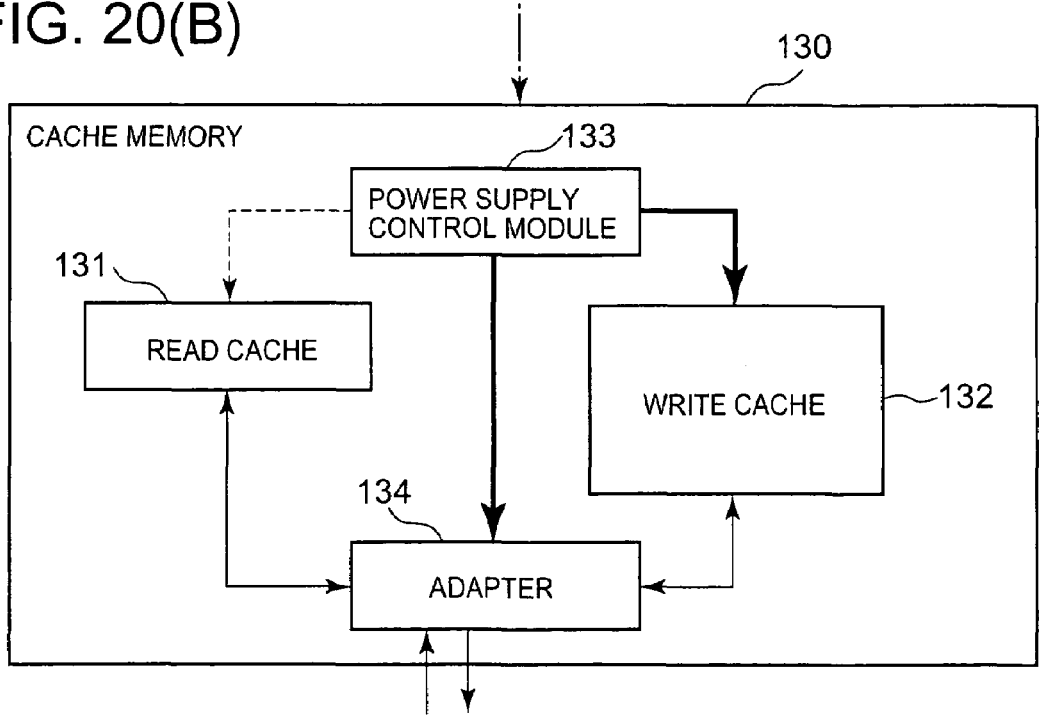

On the other hand, as is shown FIG. 20B, when destage processing is initiated, the supply of power to the read cache 131 is stopped, and power is respectively supplied only to the write cache 132 and adapter 134. As result, the power consumption during the destage processing period can be lowered even further.

6. SIXTH EXAMPLE

Figure 21:
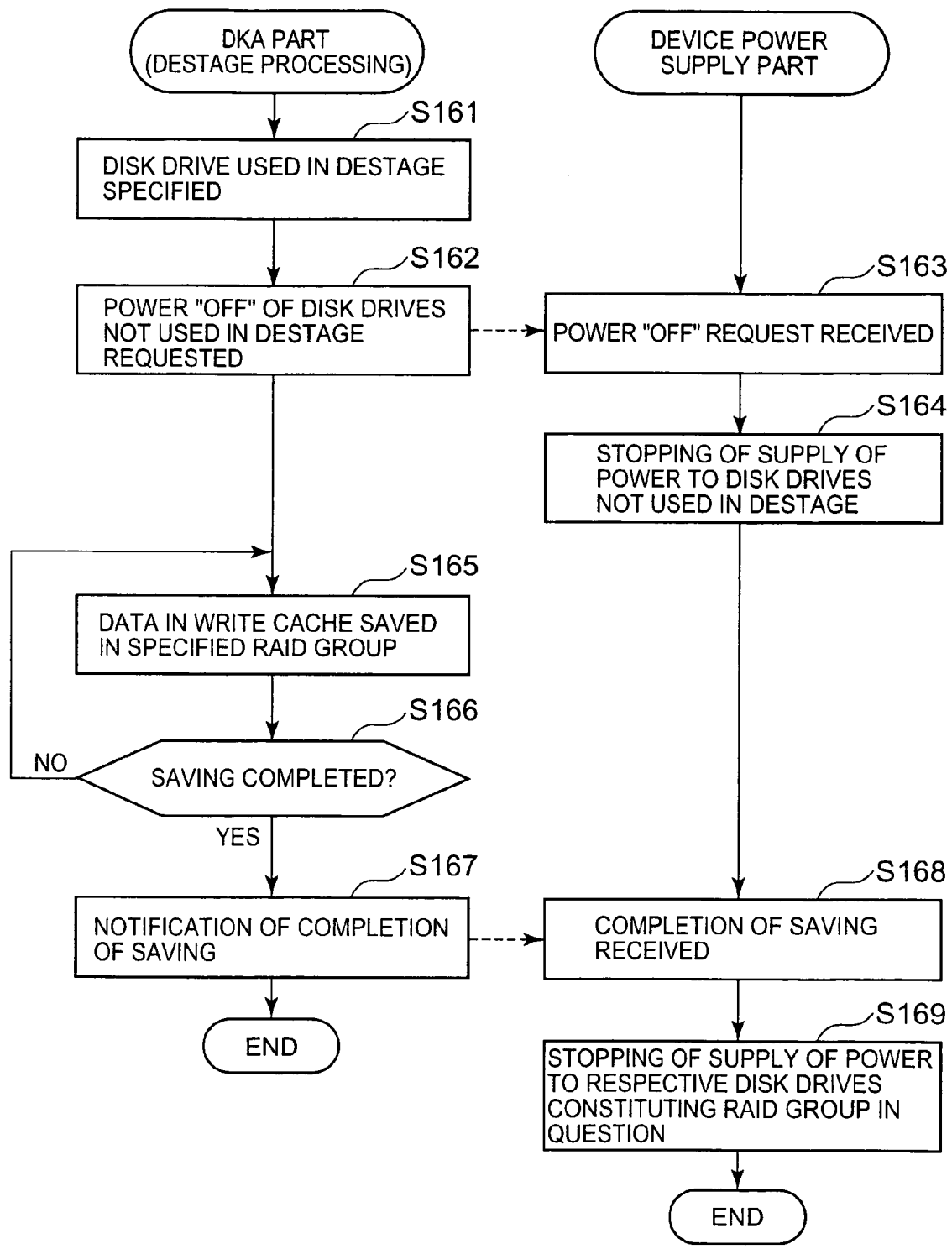
FIG. 21 is a flow chart which shows the processing that stops (in order) the supply of power from the RAID group for which destage processing has been completed in a sixth embodiment of the present invention.

A sixth example will be described with reference to FIG. 21. One characterizing feature of this example is that the supply of power to RAID groups in which writing has been completed is stopped during destage processing. First, by accessing the shared memory 140, the DKA part 120B refers to a table that shows the correspondence relationship of the LU 180, RAID group 170 and disk drives 21, and specifies the disk drives 21 that are used in destage processing and the disk drives 21 that are not used in destage processing (S161). Disk drives 21 other than the disk drive 21 used in destage processing may be judged to be disk drives that are not used in destage processing.

In concrete terms, the DKA part 120B confirms the addresses an the like of dirty data (data prior to destage) that is redundantly stored in the write cache 132, and specifies the RAID group 170 into which this dirty data is to be written and the disk drives 21 belonging to this RAID group 170.

For the disk drives 21 that are not used in the destage processing, the DKA part 120B requests stopping of the supply of power from the device power supply part 40 (S162). The reason for this is that if power is supplied to the unused disk drives 21, the battery power supply will be wastefully consumed. When the device power supply part 40 receives a request from the DKA part 120B (S163), this device power supply part 40 respectively stops the supply of power to the respective disk drives 21 that are not used in destage processing (S164).

After the supply of power to the unused disk drives 21 is stopped, the DKA part 120B initiates destage processing. Specifically, the DKA part 120B saves the data that is stored in the write cache 132 by writing this data into a specified RAID group (S165). Specifically, the DKA part 120B specifies the RAID group in which the write data is to be reflected (for which writing has been requested by the write command received from the host H1) on the basis of the address that is explicitly indicated in the write command. Then, the DKA part 120B respectively writes data (including parity data) into the respective disk drives 21 that constitute this specified RAID group.

When all of the write data that is to be saved in the RAID group has been processed (S166: YES), the DKA part 120B notifies the device power supply part 40 that the destage processing of the RAID group has been completed (S167). When the device power supply part 40 receives this notification from the DKA part 120B (S168), the device power supply part 40 respectively stops the supply of power to the respective disk drives 21 constituting the RAID group for which destage processing has been completed (S169).

Furthermore, it is possible not only to stop the supply of power to disk drives 21 that are not used prior to the initiation of destage processing, but also to make periodic or random checks in order to ascertain whether or not unused disk drives 21 are present even during destage processing, and to stop the supply of power to these unused disk drives 21 in cases where such unused disk drives 21 are discovered. For example, the battery power supply can be used much more effectively by making an inspection for the presence or absence of unused disk drives 21 each time that the writing of data is completed, or when a specified time has elapsed, and stopping the supply of power to unused disk drives 21 or RAID groups 170.

By thus stopping the supply of power to respective disk drives 21 that are not used in destage processing prior to the initiation of destage processing, and next stopping the supply of power in order during destage processing, beginning with RAID groups for which destage processing has been completed, it is possible to use the battery power supply more effectively and lengthen the memory backup period.

7. SEVENTH EXAMPLE

Figure 22:
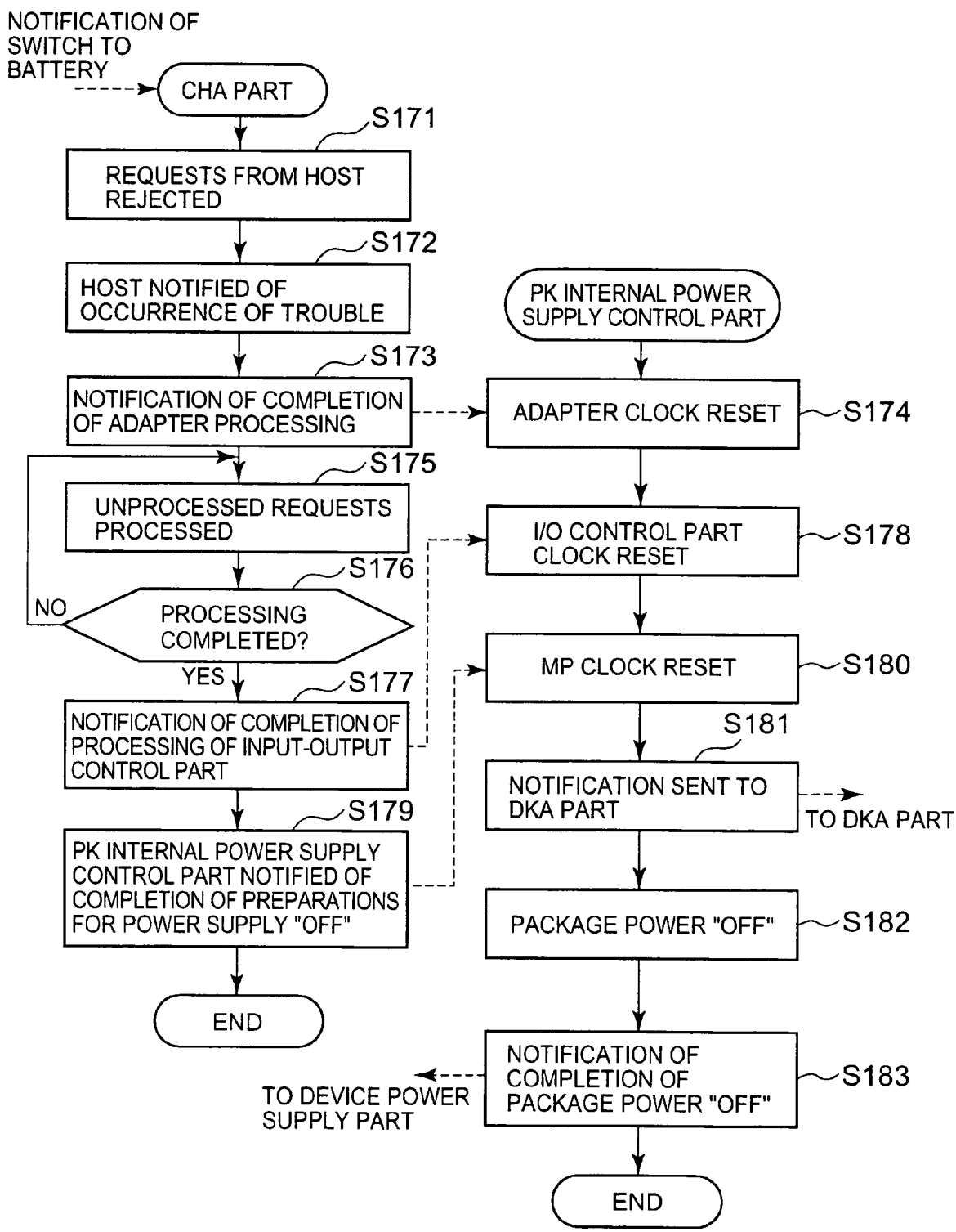
FIG. 22 is a flow chart of the processing that separately controls the supply of power for each function of the CHA part in a seventh embodiment of the present invention.

A seventh example will be described with reference to FIG. 22. One characterizing feature of this example is that the supply of power can be separately controlled for each function of the CHA part 120A.

When the CHA part 120A receives a power supply "off" request signal from the device power supply part 40, the CHA part 120A initiates end processing, blocks access requests from the host H1 (S171), and notifies the host H1 of the occurrence of trouble from the communications adapter 121A (S172). The CHA part 120A then notifies the PK internal power supply control part that the notification to the host H1 of the occurrence of trouble has been completed (S173). The PK internal power supply control part receiving this notification from the CHA part 120A stops the clock that is supplied to the communications adapter 121A (S174).

Next, via the I/O control part (LSI) 123A, the CHA part 120A processes unprocessed access requests from the host H1 (S175). When the CHA part 120A has completed the processing of unprocessed access requests (S176: YES), the CHA part 120A notifies the PK internal power supply control part of the completion of this processing (S177). When the PK internal power supply control part receives this notification, the PK internal power supply control part stops the clock supply to the I/O control part 123A (S178).

When all of the specified end processing has been completed, the CHA part 120A notifies the PK internal power supply control part that preparations for power supply "off" have been completed (S179). When the PK internal power supply control part receives this notification, the PK internal power supply control part stops the clock supply to the MP 122A (S180).

Then, after instructing the DKA part 120B to initiate destage processing (S181), the PK internal power supply control part stops the supply of power to the composite package 120 (S182), and notifies the device power supply part 40 that power supply control of the composite package 120 has been completed (S183).

Thus, by stopping the clock supply in order beginning with functions that have become unnecessary as a result of the completion of end processing, it is possible to use the battery power supply more effectively.

Furthermore, the present invention is not limited to the abovementioned embodiment. A person skilled in the art can make various additions, alterations and the like within the scope of the present invention. For example, in the abovementioned embodiment, a case was described in which the clock supply was completely stopped; however, it would also be possible to use a construction in which the clock is set at a lower value. Furthermore, in cases where respective pluralities of various circuits such as microprocessors, communications adapters and the like are present, it would also be possible to stop the clock supply to some of the circuits instead of all of the circuits, and to lower the clock for the remaining circuits.

What is claimed is:

1. The storage device comprising:
   a communications control part that is coupled to host devices and storage devices, and that controls the exchange of data with said host devices and said storage devices;
   a memory part that is used in said communications control part; and
   a device power supply part that supplies a specified power to said communications control part and said memory part,
   wherein said communications control part comprises a host interface control part that controls the exchange of data with said host devices, a slave interface control part that controls the exchange of data with said memory devices, and an internal power supply control part that controls the supply of power to said host interface control part and slave interface control part,
   in cases where trouble is detected in the supply of power to said communications control part by the device power supply part, said communications control part separately controls the supply of power to said host interface control part and said slave interface control part in accordance with the respective states of execution of first end processing that is performed by said host interface control part and second end processing that is performed by said slave interface control part, and
   said internal power supply control part stops supplying power to said communications control part after said host interface control part has completed said first end processing and said slave interface control part has completed said second end processing,
   said first end processing is processing that blocks access requests from said host devices, and that causes unprocessed access requests to be reflected in the memory part, and said second end processing is processing that causes specified data held in said memory part to be saved in said storage devices, and
   in cases where trouble is detected in the supply of power to said communications control part, said device power supply part judges whether a level of this power supply trouble is a light level or serious level, and notifies said communications control part of the level, and said communications control part
   (1) stops a clock supply to said host interface control part after said first end processing is completed, and stops a clock supply to said slave interface control part after said second end processing is completed, in cases where said notified level of the power supply trouble is said light level, and
   (2) stops the supply of power to said host interface control part after said first end processing is completed, and stops the supply of power to said slave interface control part after said second end processing is completed, in cases where said notified level of the power supply trouble is said serious level.

2. The storage device according to claim 1, wherein said communications control part initiates said second end processing after confirming that said first end processing has been completed.

3. The storage device according to claim 2, wherein a plurality of clocks are supplied to said host interface control part, and then said internal power supply control part sequentially stops said plurality of clocks in an order of execution of said first end processing.

4. The storage device according to claim 1, wherein said internal power supply control part stops a clock supply to said host interface control part when said first end processing is completed, and stops a supply of power to said slave interface control part when said second end processing is completed.

5. The storage device according to claim 1, wherein said internal power supply control part stops a clock supply to said host interface control part when said first end processing is completed, and stops a clock supply to said slave interface control part when said second end processing is completed.

6. The storage device according to claim 1, wherein said internal power supply control part stops the supply of power to said host interface control part when said first end processing is completed, and stops the supply of power to said slave interface control part when said second end processing is completed.

7. The storage device according to claim 1, wherein in cases where trouble is detected in the supply of power to said communications control part, said device power supply part determines a level of this power supply trouble, and notifies said communications control part of the level,
   and said communications control part selects one of a plurality of respectively different power supply stopping modes in accordance with said notified level of power supply trouble, and separately stops the supply of power to said host interface control part and said slave interface control part in accordance with the conditions of execution of said first end processing and said second end processing.

8. The storage device according to claim 1, wherein said device power supply part judges whether the level of said power supply trouble is said light level or said serious level on the basis of an externally input signal.

9. The storage device according to claim 1, wherein a write cache region that holds data that is written in from said host devices, and a read cache region that holds data that is read out by said host devices, are contained in said memory part, and
in cases where trouble in the supply of power to said communications control part is detected, the supply of power to said read cache region in said memory part is stopped, so that power is supplied only to said write cache region.

10. The storage device according to claim 1, wherein a plurality of parity groups are respectively constructed from said plurality of memory devices,
said second end processing is performed for each of said parity groups, and
the supply of power to said respective memory devices belonging to parity groups for which said second end processing has been completed among said respective parity groups is stopped.

11. The storage device according to claim 1, wherein a plurality of said internal power supply control parts are respectively provided for each of said host interface control parts and slave interface control parts.

12. The storage device according to claim 1, wherein said host devices are file-sharing clients,
and said host interface control part has a file server function that is used to provide files to said file-sharing clients.

13. The storage device comprising:
a communications control part that is coupled to host devices and storage devices, and that controls the exchange of data with said host devices and said storage devices;
a memory part that is used in said communications control part; and
a device power supply part that supplies a specified power to said communications control part and said memory part,
wherein said communications control part comprises a host interface control part that controls the exchange of data with said host devices, a slave interface control part that controls the exchange of data with said memory devices, and an internal power supply control part that controls the supply of power to said host interface control part and slave interface control part,
in cases where trouble is detected in the supply of power to said communications control part by the device power supply part, said communications control part separately controls the supply of power to said host interface control part and said slave interface control part in accordance with the respective states of execution of first end processing that is performed by said host interface control part and second end processing that is performed by said slave interface control part, and
said internal power supply control part stops supplying power to said communications control part after said host interface control part has completed said first end processing and said slave interface control part has completed said second end processing,
said first end processing is processing that blocks access requests from said host devices, and that causes unprocessed access requests to be reflected in the memory part, and said second end processing is processing that causes specified data held in said memory part to be saved in said storage devices, and
a plurality of said communications control parts are provided,
in cases where other trouble occurs while the slave interface control part belonging to one of said plurality of communications control parts is executing said second end processing, this second end processing that is in execution is interrupted, and
said interrupted second end processing is restarted by the slave interface control part belonging to another of said plurality of communications control parts.

14. A storage device comprising:
a disk drive group for storing data;
one or more communications control packages that respectively control the exchange of data with said disk drive group and host devices;
a cache memory that is utilized by said communications control packages; and
a device power supply part that supplies a specified power to said disk drive group, said communications control packages and said cache memory;
wherein said device power supply part comprises a main power supply and a battery power supply that operates when this main power supply stops,
said communications control packages comprise a channel adapter part that controls the exchange of data with said host devices, a disk adapter part that controls the exchange of data with said disk drive group, and a package internal power supply control part that controls the supply of power to said channel adapter part and said disk adapter part,
said device power supply part switches from said main power supply to said battery power supply in cases where said device power supply part detects a power outage state of said main power supply,
said channel adapter part initiates first end processing, blocks access requests from said host devices, and writes unprocessed access requests into said cache memory in cases where the power supply is switched from said main power supply to said battery power supply,
said disk adapter part initiates second end processing and writes the data that is stored in said cache memory into said disk drive group after said first end processing that is performed by said channel adapter part has been completed, and
said package internal power supply control part
(1) lowers the amount of power consumption of said channel adapter part by stopping a clock supply to said channel adapter part after said channel adapter part has completed said first end processing, and
(2) lowers the amount of power consumption of said disk adapter part by stopping the supply of power to said disk adapter part after said disk adapter part has completed said second end processing.

15. The storage device according to claim 14, wherein said channel adapter part comprises a communications adapter part that performs communications with said host devices, and an input-output control part that performs communications with said cache memory, wherein
said package internal power supply control part lowers the amount of power consumption of said channel adapter part in steps in accordance with the conditions of progress of said first end processing, by stopping a clock supply to said communications adapter part, and then stopping a clock supply to said input-output control part.

16. The storage device according to claim 14, wherein stopping of the clock supply and stopping of the power supply are prepared beforehand as means for lowering the amount of power consumption of said channel adapter part and said disk adapter part, said device power supply part judges whether the power outage state of said main power supply is slight trouble or serious trouble, and said package internal power supply control part (1) lowers the amount of power consumption of said channel adapter part and said disk adapter part by stopping the clock supply to said channel adapter part and said disk adapter part in cases where it is judged that said power outage state is said slight trouble, and (2) lowers the amount of power consumption of said channel adapter part and said disk adapter part by stopping the supply of power to said channel adapter part and said disk adapter part in cases where it is judged that said power outage state is said serious trouble.

17. A storage device power consumption control method which is a method for controlling the power consumption of a storage device which comprises a disk drive group for storing data;

one or more communications control packages that respectively control the exchange of data with said disk drive group and host devices;

a cache memory that is utilized by said communications control packages; and a device power supply part that supplies a specified power to said disk drive group, said communications control packages and said cache memory;

and in which said device power supply part comprises a main power supply and a battery power supply that operates when this main power supply stops, and said communications control packages comprise a channel adapter part that controls the exchange of data with said host devices, a disk adapter part that controls the exchange of data with said disk drive group, and a package internal power supply control part that controls the supply of power to said channel adapter part and said disk adapter part, this method comprising the steps of:

judging whether or not a power outage state has occurred in said main power supply;

switching from said main power supply to said battery power supply in cases where it is judged that a power outage state has occurred in said main power supply;

notifying said channel adapter part that the power supply has been switched from said main power supply to said battery power supply;

blocking access requests from said host devices by said channel adapter part that has received this notification;

writing unprocessed access requests into said cache memory by said channel adapter part that has blocked access requests from said host devices;

notifying said package internal power supply control part of the completion of writing of said unprocessed access requests into said cache memory by said channel adapter part;

stopping a clock supply to said channel adapter part by said package internal power supply control part that has received this notification;

sending a notification to said disk adapter part by said package internal power supply control part that has stopped the clock supply to said channel adapter part;

saving write data stored in said cache memory in said disk drive group by said disk adapter part that has received this notification;

sending a notification to said package internal power supply control part by said disk adapter part that the saving of said write data in said disk drive group has been completed;

stopping the supply of power to said communications control package by said package internal power supply control part that has received this notification, and sending a notification to said device power supply part indicating that the supply of power to the package as a whole has been stopped; and supplying power only to said cache memory by said device power supply part that has received this notification, so that data stored in said cache memory is held.

* * * * *